United States Patent
Pernites et al.

(10) Patent No.: US 10,858,569 B2
(45) Date of Patent: Dec. 8, 2020

(54) METHODS FOR CEMENTING WELL BORES USING CLEANING FLUIDS WITH NUT SHELLS

(71) Applicant: American Cementing, LLC, Tulsa, OK (US)

(72) Inventors: Roderick B. Pernites, Spring, TX (US); Diankui Fu, Houston, TX (US); Jordan Lee Clark, Tomball, TX (US)

(73) Assignee: American Cementing, LLC, Tulsa, OK (US)

( * ) Notice: Subject to any disclaimer, the term of this patent is extended or adjusted under 35 U.S.C. 154(b) by 0 days.

(21) Appl. No.: 16/219,047

(22) Filed: Dec. 13, 2018

(65) Prior Publication Data
US 2020/0190389 A1    Jun. 18, 2020

(51) Int. Cl.
*C09K 8/42* (2006.01)
*E21B 33/16* (2006.01)
*C09K 8/40* (2006.01)

(52) U.S. Cl.
CPC .............. *C09K 8/424* (2013.01); *C09K 8/40* (2013.01); *E21B 33/16* (2013.01); *C09K 2208/04* (2013.01)

(58) Field of Classification Search
CPC ...... C09K 8/424; C09K 8/40; C09K 2208/04; E21B 33/16
See application file for complete search history.

(56) References Cited

U.S. PATENT DOCUMENTS

| | | | |
|---|---|---|---|
| 4,717,488 A | 1/1988 | Seheult | |
| 4,796,703 A | 1/1989 | Gabel et al. | |
| 5,904,208 A | 5/1999 | Ray et al. | |
| 6,063,737 A | 5/2000 | Haberman et al. | |
| 7,231,976 B2 | 6/2007 | Berry et al. | |
| 7,318,477 B2 | 1/2008 | Hou | |
| 8,043,977 B2 | 10/2011 | Whitfill et al. | |
| 9,012,379 B2 | 4/2015 | Muthusamy et al. | |
| 9,062,241 B2 | 6/2015 | Zamora et al. | |
| 9,534,164 B2 | 1/2017 | Al-Subhi et al. | |

(Continued)

FOREIGN PATENT DOCUMENTS

| | | |
|---|---|---|
| WO | 2014/022292 A2 | 2/2014 |
| WO | 2015/126368 A1 | 8/2015 |

(Continued)

OTHER PUBLICATIONS

Corbett, D. et al., *Chemical Composition of Apricot Pit Shells and Effect of Hot-Water Extraction*, 8 Energies 9640-54 (2015).

(Continued)

*Primary Examiner* — Crystal J Miller
(74) *Attorney, Agent, or Firm* — Keith B. Willhelm

(57) ABSTRACT

Liners may be cemented in a well bore contaminated with an oil-based or synthetic fluid by injecting an aqueous cleaning fluid into the well, energizing the cleaning fluid to displace fluids present in an annulus between the liner and the bore and to create turbulent flow of the cleaning fluid in the annulus, and injecting a cementitious slurry into the annulus after the cleaning fluid. The cleaning fluid comprises a weighting agent, a suspending agent, a surfactant, and nut shell particulates. The turbulent flow of the cleaning fluid through the annulus is effective to remove oily residues left by the oil-based or synthetic fluid.

35 Claims, 18 Drawing Sheets

(56) References Cited

U.S. PATENT DOCUMENTS

| | | | |
|---|---|---|---|
| 9,809,737 B2 | 11/2017 | Roddy et al. | |
| 2009/0090508 A1* | 4/2009 | Brouse | E21B 7/20 166/289 |
| 2012/0305250 A1* | 12/2012 | Burts, Jr. | C04B 26/28 166/292 |
| 2012/0309653 A1* | 12/2012 | Medvedev | C09K 8/601 507/110 |
| 2014/0166285 A1 | 6/2014 | Santra et al. | |
| 2014/0038857 A1 | 2/2015 | Miller et al. | |
| 2016/0130495 A1* | 5/2016 | Doan | C09K 8/40 166/292 |
| 2016/0230069 A1 | 8/2016 | Maker et al. | |

FOREIGN PATENT DOCUMENTS

| | | |
|---|---|---|
| WO | 2015/191055 A1 | 12/2015 |
| WO | 2018/009203 A1 | 1/2018 |
| WO | 2018/136032 A1 | 7/2018 |

OTHER PUBLICATIONS

Curbelo, F. et al., *Vegetable Oil-based Preflush Fluid in Well Cementing*, 170 J. Petroleum Sci. & Eng. 392-399 (2018).

Preston, C. et al., *What's in a Nutshell: An Investigation of Structure by C-13Cross-Polarization Magic-Angle Spinning Nuclear Magnetic Resonance Spectroscopy*, 40 J. Agric. Food Chem. 206-210 (1992).

Rawlins, C. et al., *Experimental Study on Oil and Solids Removal in Nutshell Filters for Produced Water Treatment*, SPE-190108-MS (2018).

Zhang, J. et al., *Physiochemical Properties of Camillia Nut Shell and its Thermal Degradation Characteristics*, 10 (1) BioResources 647-659 (2015).

\* cited by examiner

Test and Control Spacer Fluids
(All fluids include 0.01 gpb FP-6L defoamer)

| Fluid | Density (ppg) | Weighting Agent | WA Load (ppb) | Susp. Agent | SA Load (ppb) | Surfactant | Surfactant Load (gpb) | Nut Shells | Shell Load (ppb) | Shell Size (US Mesh) |
|---|---|---|---|---|---|---|---|---|---|---|
| 1C | 11 | SF | 180.5 | DG | 0.8 | 1 | 2 | - | - | - |
| 1 | 11 | SF | 174 | DG | 0.8 | 1 | 2 | BWS | 13.5 | 20/100 |
| 2C | 12 | SF | 248.2 | DG | 0.8 | 1 | 2 | - | - | - |
| 2 | 12 | SF | 242 | DG | 0.8 | 1 | 2 | BWS | 13.5 | 20/100 |
| 3C | 14 | FAF/B | 354/35.31 | WG | 1.693 | 1 | 2 | - | - | - |
| 3 | 14 | FAF/B | 348/35.31 | WG | 1.693 | 1 | 2 | BWS | 13.5 | 20/100 |
| 4C | 12 | FAC | 258 | WG | 1.25 | 1 | 1 | - | - | - |
| 4 | 12 | FAC | 252 | WG | 1.25 | 1 | 1 | BWS | 13.5 | 20/100 |
| 5C | 12 | FAC | 258.4 | WG | 1.25 | 1 | 2 | - | - | - |
| 5 | 12 | FAC | 252 | WG | 1.25 | 1 | 2 | BWS | 13.5 | 20/100 |

FIG. 2A

Test and Control Spacer Fluids (All fluids include 0.01 gpb FP-6L defoamer)

| Fluid | Density (ppg) | Weighting Agent | WA Load (ppb) | Susp. Agent | SA Load (ppb) | Surfactant | Surfactant Load (gpb) | Nut Shells | Shell Load (ppb) | Shell Size (US Mesh) |
|---|---|---|---|---|---|---|---|---|---|---|
| 6C | 11 | SF | 180.3 | DG | 0.8 | 2 | 1 | - | - | - |
| 6 | 11 | SF | 174 | DG | 0.8 | 2 | 1 | BWS | 13.5 | 20/100 |
| 7C | 12 | SF | 248 | DG | 0.8 | 2 | 1 | - | - | - |
| 7 | 12 | SF | 242 | DG | 0.8 | 2 | 1 | BWS | 13.5 | 20/100 |
| 8C | 12 | SF | 248.2 | DG | 0.8 | 2 | 1.25 | - | - | - |
| 8 | 12 | SF | 242 | DG | 0.8 | 2 | 1.25 | BWS | 13.5 | 20/100 |
| 9C | 12 | FAC | 258.3 | WG | 1.25 | 2 | 1 | - | - | - |
| 9 | 12 | FAC | 252 | WG | 1.25 | 2 | 1 | BWS | 13.5 | 20/100 |

FIG. 2B

Test and Control Spacer Fluids
(All fluids include 0.01 gpb FP-6L defoamer)

| Fluid | Density (ppg) | Weighting Agent | WA Load (ppb) | Susp. Agent | SA Load (ppb) | Surfactant | Surfactant Load (gpb) | Nut Shells | Shell Load (ppb) | Shell Size (US Mesh) |
|---|---|---|---|---|---|---|---|---|---|---|
| 10C | 11 | SF | 179.9 | DG | 0.8 | 3 | 0.25/0.25 | - | - | - |
| 10 | 11 | SF | 174 | DG | 0.8 | 3 | 0.25/0.25 | BWS | 13.5 | 20/100 |
| 11C | 12 | SF | 247.9 | DG | 0.8 | 3 | 0.5/0.5 | - | - | - |
| 11 | 12 | SF | 242 | DG | 0.8 | 3 | 0.5/0.5 | BWS | 13.5 | 20/100 |
| 12 | 12 | SF | 235 | DG | 0.8 | 3 | 0.5/0.5 | BWS | 27 | 20/100 |
| 13C | 12 | SF | 247.6 | DG | 0.8 | 3 | 0.25/0.25 | - | - | - |
| 13 | 12 | SF | 241 | DG | 0.8 | 3 | 0.25/0.25 | BWS | 13.5 | 20/100 |
| 14C | 14 | FAF/B | 353.7/35.31 | WG | 1.693 | 3 | 0.5/0.5 | - | - | - |
| 14 | 14 | FAF/B | 347/35.31 | WG | 1.693 | 3 | 0.5/0.5 | BWS | 13.5 | 20/100 |
| 15 | 12 | SF | 238.2 | DG | 0.8 | 3 | 0.5/0.5 | BWS | 20.25 | 20/100 |
| 16 | 12 | SF | 232.4 | DG | 0.8 | 3 | 0.5/0.5 | BWS | 33.75 | 20/100 |
| 17 | 12 | SF | 241.4 | DG | 0.8 | 3 | 0.5/0.5 | PS | 13.5 | 30/60 |
| 18 | 12 | SF | 238.2 | DG | 0.8 | 3 | 0.5/0.5 | PS | 20.25 | 30/60 |
| 19 | 12 | SF | 235.5 | DG | 0.8 | 3 | 0.5/0.5 | PS | 27 | 30/60 |
| 20 | 12 | SF | 231.7 | DG | 0.8 | 3 | 0.5/0.5 | PS | 33.75 | 30/60 |

FIG. 2C

Test and Control Spacer Fluids
(All fluids include 0.01 gpb FP-6L defoamer)

| Fluid | Density (ppg) | Weighting Agent | WA Load (ppb) | Susp. Agent | SA Load (ppb) | Surfactant | Surfactant Load (gpb) | Nut Shells | Shell Load (ppb) | Shell Size (US Mesh) |
|---|---|---|---|---|---|---|---|---|---|---|
| 21C | 12 | FAF | 253.4 | WG | 5.08 | 4 | 1 | - | - | - |
| 21 | 12 | FAF | 251 | WG | 5.08 | 4 | 1 | BWS | 5 | 20/100 |
| 22 | 12 | FAF | 246.8 | WG | 5.08 | 4 | 1 | BWS | 13.5 | 20/100 |
| 23 | 12 | FAF | 240.2 | WG | 5.08 | 4 | 1 | BWS | 27 | 20/100 |
| 24 | 12 | FAF | 250 | WG | 5.08 | 4 | 1 | PS | 6.75 | 30/60 |
| 25 | 12 | FAF | 246.6 | WG | 5.08 | 4 | 1 | PS | 13.5 | 30/60 |
| 26 | 12 | FAF | 243.3 | WG | 5.08 | 4 | 1 | PS | 20.25 | 30/60 |
| 27 | 12 | FAF | 239.9 | WG | 5.08 | 4 | 1 | PS | 27 | 30/60 |
| 28 | 11 | SF | 171 | DG | 0.8 | 1 | 2 | BWS | 20.25 | 20/100 |
| 29 | 11 | SF | 167.8 | DG | 0.8 | 1 | 2 | BWS | 27 | 20/100 |
| 30 | 11 | SF | 164.7 | DG | 0.8 | 1 | 2 | BWS | 33.75 | 20/100 |
| 31 | 11 | SF | 174 | DG | 0.8 | 1 | 2 | PS | 13.5 | 30/60 |
| 32 | 11 | SF | 170.7 | DG | 0.8 | 1 | 2 | PS | 20.25 | 30/60 |
| 33 | 11 | SF | 167.5 | DG | 0.8 | 1 | 2 | PS | 27 | 30/60 |
| 34 | 11 | SF | 164.3 | DG | 0.8 | 1 | 2 | PS | 33.75 | 30/60 |

FIG. 2D

Test and Control Spacer Fluids (All fluids include 0.01 gpb FP-6L defoamer)

| Fluid | Density (ppg) | Weighting Agent | WA Load (ppb) | Susp. Agent | SA Load (ppb) | Surfactant | Surfactant Load (gpb) | Nut Shells | Shell Load (ppb) | Shell Size (US Mesh) |
|---|---|---|---|---|---|---|---|---|---|---|
| 35C | 11.5 | SF | 213.7 | DG | 0.8 | 2 | 0.25 | - | - | - |
| 35 | 11.5 | SF | 212.7 | DG | 0.8 | 2 | 0.25 | BWS | 2 | 20/100 |
| 36 | 11.5 | SF | 212.1 | DG | 0.8 | 2 | 0.25 | BWS | 3.375 | 20/100 |
| 37 | 11.5 | SF | 210.5 | DG | 0.8 | 2 | 0.25 | BWS | 6.75 | 20/100 |
| 38 | 11.5 | SF | 207.3 | DG | 0.8 | 2 | 0.25 | BWS | 13.5 | 20/100 |
| 39 | 11.5 | SF | 212.7 | DG | 0.8 | 2 | 0.25 | PS | 2 | 30/60 |
| 40 | 11.5 | SF | 212.1 | DG | 0.8 | 2 | 0.25 | PS | 3.375 | 30/60 |
| 41 | 11.5 | SF | 210.4 | DG | 0.8 | 2 | 0.25 | PS | 6.75 | 30/60 |
| 42 | 11.5 | SF | 207.2 | DG | 0.8 | 2 | 0.25 | PS | 13.5 | 30/60 |

*FIG. 2E*

Test and Control Spacer Fluids
(All fluids include 0.01 gpb FP-6L defoamer)

| Fluid | Density (ppg) | Weighting Agent | WA Load (ppb) | Susp. Agent | SA Load (ppb) | Surfactant | Surfactant Load (gpb) | Nut Shells | Shell Load (ppb) | Shell Size (US Mesh) |
|---|---|---|---|---|---|---|---|---|---|---|
| 43C | 14 | FAF/B | 353.4/35.31 | WG | 1.693 | 3 | 0.25/0.25 | - | - | - |
| 43 | 14 | FAF/B | 352.5/35.31 | WG | 1.693 | 3 | 0.25/0.25 | BWS | 2 | 20/100 |
| 44 | 14 | FAF/B | 351.8/35.31 | WG | 1.693 | 3 | 0.25/0.25 | BWS | 3.375 | 20/100 |
| 45 | 14 | FAF/B | 349.5/35.31 | WG | 1.693 | 3 | 0.25/0.25 | BWS | 8 | 20/100 |
| 46 | 14 | FAF/B | 346.8/35.31 | WG | 1.693 | 3 | 0.25/0.25 | BWS | 13.5 | 20/100 |
| 47 | 14 | FAF/B | 352.4/35.31 | WG | 1.693 | 3 | 0.25/0.25 | PS | 2 | 30/60 |
| 48 | 14 | FAF/B | 351.8/35.31 | WG | 1.693 | 3 | 0.25/0.25 | PS | 3.375 | 30/60 |
| 49 | 14 | FAF/B | 350.1/35.31 | WG | 1.693 | 3 | 0.25/0.25 | PS | 6.75 | 30/60 |
| 50 | 14 | FAF/B | 346.7/35.31 | WG | 1.693 | 3 | 0.25/0.25 | PS | 13.5 | 30/60 |
| 51C | 11 | SF | 180.5 | WG | 0.8 | 1 | 2 | - | - | - |
| 51 | 11 | SF | 177.4 | WG | 0.8 | 1 | 2 | AP | 6.25 | 40/70 |
| 52 | 11 | SF | 173.8 | WG | 0.8 | 1 | 2 | AP | 13.5 | 40/70 |
| 53 | 11 | SF | 167.1 | WG | 0.8 | 1 | 2 | AP | 27.0 | 40/70 |
| 54 | 11 | SF | 163.8 | WG | 0.8 | 1 | 2 | AP | 33.25 | 40/70 |

*FIG. 2F*

METHODS FOR CEMENTING WELL BORES USING CLEANING FLUIDS WITH NUT SHELLS

FIELD OF THE INVENTION

The present invention relates to methods for cementing oil and gas well bores and, more particularly, to cementing methods that use a weighted, aqueous cleaning fluid having nut shells to clean the bore before injecting cement into the well.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill hit is attached to a series of pipe sections referred to as a drill string. The drill string is suspended from a derrick and rotated by a motor in the derrick. A drilling fluid or "mud" is pumped down the drill string, through the bit, and into the well bore. The fluid serves to lubricate the bit. The drilling mud also carries cuttings from the drilling process hack to the surface as it travels up the well bore. As drilling progresses downward, the drill string is extended by adding more pipe sections or "joints."

A modern oil well typically includes a number of tubes extending wholly or partially within other tubes. That is, a well is first drilled to a certain depth. Larger diameter pipes, or casings, are placed in the well and cemented in place to prevent the sides of the borehole from caving in. After the initial section has been drilled, cased, and cemented, drilling will proceed with a somewhat smaller well bore. The smaller bore is lined with somewhat smaller pipes or "liners." The liner is suspended from the original or "host" casing by an anchor or "hanger," A well may include a series of smaller liners, and may extend for many thousands of feet, commonly up to and over 25,000 feet.

As noted, liners are cemented in the well bore as the well is constructed. That is, the liner necessarily is smaller than the well bore in which it is installed. That gap between the liner and the well bore is referred to as the annulus, and it is filled with cement after the liner has been installed. The cement helps to secure the liner in the well bore and protect it against corrosion and erosion. It also supports the borehole walls from collapse. Most importantly, the cement is intended to form a complete seal around the liner. Hydrocarbons and other fluids in the formation thus are prevented from migrating to the surface. If the liner leaks, the cement also helps to ensure that fluids flowing through the liner do not contaminate the surrounding formation, and especially water-bearing formations. A complete seal also gives more precise control over stimulation processes, such as fracturing and acidizing, and avoids unintentional stimulation of untargeted zones.

The liner is cemented in the well bore by injecting a cementitious, settable slurry down the liner and allowing it to flow up the annulus. The cement slurry is allowed to set, that is, solidify and harden into what hopefully will be a continuous seal throughout the annulus. The chemical composition and properties of drilling mud and cement slurries, however, are quite different. If drilling mud mixes with the cement slurry, the cement will not set properly. Drilling mud, especially gelled drilling muds, also can be difficult to displace from the well bore. Other drilling muds, such as oil-based and synthetic muds, contaminate the surface of the well bore and liner. Residual drilling mud and, since the cement slurry is water based, oily residue can prevent the cement from forming an intimate, continuous bond with the liner and well bore. The cement may be weakened in certain areas, or there may be flow paths through it.

The liner and well bore, therefore, typically must be cleaned thoroughly before a cement slurry is pumped into the annulus. Fluid may be injected under turbulent flow to thin and disperse drilling mud—a process referred to as washing or flushing. In addition, a volume or "pad" of fluid typically will be injected ahead of the cement. The pad of fluid, commonly referred to as a cleaning fluid or cement spacer, separates or "spaces" the incoming cement from the drilling mud already in the well. The spacer will displace the mud, clean the annulus, and water-wet the annulus surfaces to prepare them for bonding to the cement.

In order to displace the mud, however, the spacer fluid must be heavier than the mud. That is, the spacer must have a density greater than the mud which it is intended to displace. It also must be thicker, that is, the spacer fluid must have a higher viscosity and yield point than the drilling mud. Spacer fluids are water based, however, and water typically is both lighter and thinner than drilling muds.

Thus, spacer fluids typically incorporate weighting agents, such as fly ash, barite, calcium carbonate, hematite, and hausmannite. While they may have other effects, weighting agents primarily are intended to increase the density of the spacer. They typically are fine, relatively inert solid particulates. A gelling and suspending agent, such as welan, diutane, gellan, xanthan, and galactomannan gums, will be added to suspend the weighting agent particles. The suspending agent also will tend to increase the viscosity and yield strength of the spacer fluid, thus increasing its effectiveness in pushing out the drilling mud.

While weighting and suspending agents are essential components, many different spacer formulations have been used in cementing wells. The economics and characteristics of a particular well, however, may render it more suitable to a particular spacer fluid and cement. A spacer fluid may provide extraordinary results in one well and be completely s unsuitable for use in another. Thus, general statements should be taken as such, and not as definitive, immutable principles. Nevertheless, conventional spacer fluids stiffer certain deficiencies, especially when a well has been drilled using synthetic or oil-based drilling muds. Those muds leave oily residues and particulates that conventional spacers are not always able to adequately clean and remove from the annulus.

Oil-based muds have a petroleum-based major liquid phase. Most commonly it will be crude oils, distilled fractions of crude oil, such as diesel oil, kerosene, and mineral oil, and heavy petroleum refinery liquid residues. Synthetic muds utilize a synthetic oil, usually a crude oil derivative, as the major liquid phase. Synthetic oils often are preferred over oil-based fluids because the fumes are generally less toxic than those of the petroleum products used in oil-based fluids. Examples include linear alpha olefins, isomerized olefins, poly alpha olefins, linear alkyl benzenes, and vegetable and hydrocarbon-derived ester compounds. Aqueous solutions may be emulsified as a minor component of the liquid phase in both synthetic and oil-based muds.

Despite their higher cost of acquisition and disposal, oil-based and synthetic muds often are preferred over water-based muds for several reasons. They transport cuttings more efficiently so less fluid generally is required. They also are more suitable for higher-temperature wells, and wells where the borehole extends through formations like shale or salt that are particularly susceptible to water induced swelling or deterioration. Because they provide superior lubrication over water-based muds, oil-based and synthetic muds may be preferred for high angle and extended-reach drilling. Even where a water-based mud is being used, a certain quantity or "pill" of an oil-based or synthetic mud may be pumped into a well if the drill string becomes stuck while the bore is being drilled.

Unlike water-based muds, however, synthetic and oil-based muds leave an oily, residue on the surfaces of the annulus. Cement slurries are water-based. The oily residue left by synthetic and oil-based muds tends to repel the cement slurry, thereby preventing it from forming an intimate, continuous bond with the liner and formation. Conventional spacers may remove much of the mud particulates. They also incorporate surfactants to help remove oily residues that are more difficult to remove from liner and formation surfaces. Unfortunately, conventional spacers all too often leave significant amounts of oily residue and particulates that can interfere with the formation of a continuous cement s sheath throughout the annulus.

The statements in this section are intended to provide background information related to the invention disclosed and claimed herein. Such information may or may not constitute prior art. It will be appreciated from the foregoing, however, that there remains a need for new and improved spacer fluids and, more particularly, to spacer fluids that more effectively clean the annulus and prepare it for cementing when synthetic and oil-based drilling muds have been used. Such disadvantages and others inherent in the prior art are addressed by various aspects and embodiments of the subject invention.

SUMMARY OF THE INVENTION

The subject invention, in its various aspects and embodiments, relates generally to methods for cementing a well that include cleaning the well bore in advance of the cement with a weighted, aqueous cleaning fluid having nut shells. The invention encompasses various embodiments and aspects, some of which are specifically described and illustrated herein.

One aspect of the invention provides for a method of cementing a liner in a well bore. The method comprises injecting an aqueous cleaning fluid into the well, energizing the cleaning fluid to displace fluids present in an annulus between the liner and bore; and injecting a cementitious slurry into the annulus after the cleaning fluid. The cleaning fluid comprises a weighting agent, a suspending agent, and nut shell particulates. In other embodiments the cleaning fluid comprises a surfactant, a detergent, or both.

Still other embodiments provide such methods where the annulus has been contaminated with an oil or synthetic based fluid and methods where the cleaning fluid is energized to create turbulent flow of the cleaning fluid in the annulus. Yet other embodiments provide such methods where the cleaning fluid is pumped at rates at least about 1 bbl/minute, or at least about 2 to 5 bbl/minute.

Additional embodiments provide such methods where the nut shell particulates are walnut shell particulates, pecan shell particulates, or apricot pit particulates, or mixtures thereof. Still other embodiments provide such methods where the nut shell particulates are one or more nut shell particulates derived from the shells or pits of the group consisting of chestnuts, beechnuts, oak nuts, hazelnuts, walnut, pecans, other hickory nuts, coffee, jujube, mango, olive, açai palms, date palms, sabal palms, coconut palms, pistachio, white sapote, cashew, almond, apricot, cherry, damson, nectarine, peach, plum, Brazil nuts, and macadamia nuts.

Other embodiments provide such methods where the cleaning fluid comprises at least about 5 ppb of nut shell particulates or from about 5 up to about 200, about 100, or about 50 ppb nut shell particulates. Other embodiments comprise from about 5 to about 35 ppb of nut shell particulates.

Additional embodiments provide such methods where the nut shell particulates have a size of from about 6 to about 325 mesh, from about 20 to about 100 mesh, or from about 30 to about 70 mesh.

Yet other embodiments provide such methods where the cleaning fluid has a density of from about 9 to about 16 ppg or from about 9.5 to about 12.5 ppg.

In other aspects and embodiments, the invention provides for methods of cementing a liner in a well bore contaminated with an oil-based or synthetic fluid. The method comprises injecting an aqueous cleaning fluid into the well, energizing the cleaning fluid to displace fluids present in an annulus between the liner and the bore and to create turbulent flow of the cleaning fluid in the annulus, and injecting a cementitious slurry into the annulus after the cleaning fluid. The cleaning fluid comprises a weighting agent, a suspending agent, a surfactant, and nut shell particulates. The turbulent flow of the cleaning fluid through the annulus is effective to remove oily residues left by the oil-based or synthetic fluid.

In still other aspects and embodiments the invention provides for methods of constructing a well. The method comprises drilling a bore using an oil-based or synthetic drilling mud, installing a liner in the bore, injecting an aqueous cleaning fluid into the well to displace fluids in an annulus between the liner and the bore, injecting a cementitious slurry into the annulus, and allowing the cementitious slurry to set. The cleaning fluid comprises a weighting agent, a suspending agent, and nut shell particulates. In other embodiments the cleaning fluid comprises a surfactant, a detergent, or both.

Still other embodiments provide such methods where the annulus has been contaminated with an oil or synthetic based fluid and methods where the cleaning fluid is energized to create turbulent flow of the cleaning fluid in the annulus. Yet other embodiments provide such methods where the cleaning fluid is pumped at rates at least about 1 bbl/minute, or at least about 2 to 5 bbl/minute.

In yet other aspects and embodiments the invention provides for aqueous well cleaning fluids. The cleaning fluids comprise a weighting agent, a suspending agent, and nut shell particulates. In other embodiments the cleaning fluid comprises a surfactant, a detergent, or both.

Finally, still other aspect and embodiments of the invention will provide novel methods and fluids having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

BRIEF DESCRIPTION OF THE DRAWINGS

FIGS. 2A to 2F are tables showing the composition and certain properties of the fluids tested in Examples 1-13.

Figure 1A:
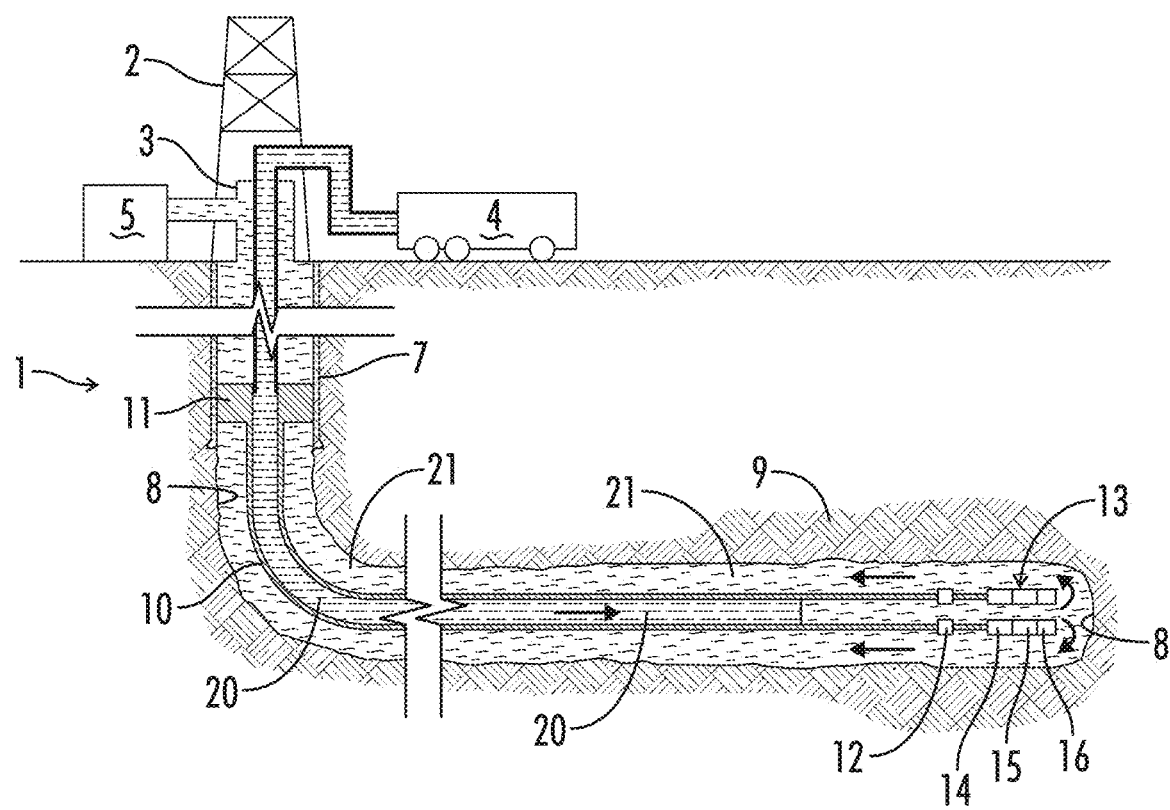
FIG. 1A is a schematic illustration of a liner assembly 10 being cleaned by a spacer fluid 20 of the subject invention in preparation for cementing liner 10 in a bore 8 of a well 1, wherein a spacer fluid 20 is displacing a drilling mud 21 present in well 1.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to methods for cementing a liner in a well and, especially to methods that inject a weighted aqueous cleaning fluid to clean the well in preparation for cementing the liner. As used herein, spacer fluid is intended to reference fluids that are used to separate or displace other fluids in a well. Cleaning fluids are spacer fluids that are injected into a well ahead of a s cement slurry to displace fluid in the annulus between the liner and well bore and to clean the surfaces of the annulus in preparation for cementing.

The novel methods include injecting a cleaning fluid with nut shells, preferably under turbulent flow, in advance of a cementitious slurry. It is believed that the addition of nut shells to conventional spacer fluids will provide enhanced cleaning of synthetic and oil-based fluids and will improve the stability of the fluid. As discussed below, nut shells have been used in various applications in the oil and gas industry. It is believed, however, that the workers in the art have failed to appreciate the important and significant performance advantages provided by using cleaning fluids with nut shells in cementing oil and gas wells.

Various specific embodiments of the invention will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

Overview of Cementing Operations

Broad embodiments of the invention comprise methods for cementing liners that include cleaning the annulus with a weighted, aqueous cleaning fluid comprising nut shells. There are many different approaches to cementing a liner. Likewise, many different systems will be used to prepare and deliver the fluids into a well. It is believed that cleaning the annulus with cleaning fluids incorporating nut shells may be accomplished in any such conventional methods and systems.

The use and practice of the novel cleaning methods and fluids will be described by reference to FIG. 1 which schematically illustrate a cementing operation, that is, a primary cement job where a cement sheath is formed around a liner in a well. As may be seen in FIG. 1A, a well 1 is serviced by a derrick 2, a cementing head 3, and a cement s trailer 4. As described further below, cement trailer 4 will be used to prepare a cleaning fluid 20 and a cement slurry 22. Pumps on cement trailer 4 will be used to introduce cleaning fluid 20 and cement slurry 22 into well 1. Other surface equipment (not shown) will be used in the operation, including retention tank 5 where fluids displaced from well 1 will be held for disposal or recycling.

The upper portion of well 1 is provided with a casing 7, while the lower portion is an open bore 8 extending generally horizontally through a hydrocarbon bearing formation 9. A liner assembly 10 has been suspended from casing 7 by a hanger assembly 11 and extends through open bore 8. Liner assembly 10 includes various tools, including toe valve 12 and a float assembly 13. Float assembly 13 typically includes various tools that assist in running liner 10 into well 1 and cementing it in bore 8, such as a landing collar 14, a float collar 15, and a float shoe 16.

FIG. 1A depicts well 1 as liner 10 and bore 8 are being cleaned by cleaning fluid 20. A quantity or "pad" of cleaning fluid 20 is being pumped from trailer 4 into well 1. As fluid 20 is pumped, it will displace a drilling mud 21 that was used to drill bore 8, or any other fluids present in liner 10 and bore 8. Drilling mud 21 will flow up the annulus between liner 10 and bore 8 to the surface where it is diverted into retention tank 5.

Figure 1B:
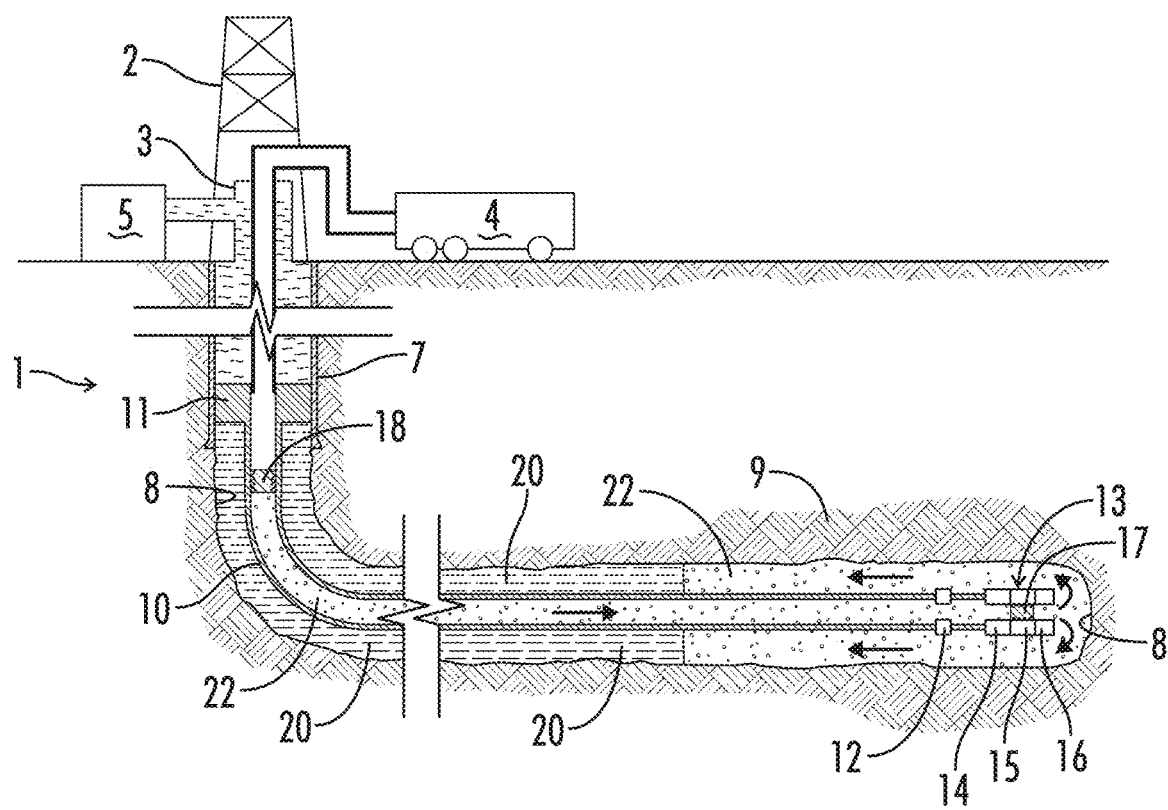
FIG. 1B is a schematic illustration of liner assembly 10 being cemented in bore 4 of well 1, which shows a cement slurry 22 being pumped into liner 10 behind spacer fluid 20.

FIG. 1B depicts well 1 as liner 10 is being cemented in bore 8. Cement 22 is being pumped through liner 10 into bore 8. Typically, a "bottom" plug 17 will be deployed in advance of cement 22. It separates cement 22 from cleaning fluid 20 as it moves through liner 10. As shown in FIG. 1B, bottom plug 17 will land on float collar 15 in float assembly 13. Bottom plug 17 has been opened by increasing pressure behind cement 22, allowing cement 22 to flow out the lower end of liner 10 and up into the annulus. A top or "wiper" plug 18 is being pumped behind cement 22. It follows cement 22 as it flows through liner 10. Wiper plug 18 will help clean and remove cement 22 from the inside of liner 10. It will pass through toe valve 12 and eventually seat on landing collar 14, as shown in FIG.

Figure 1C:
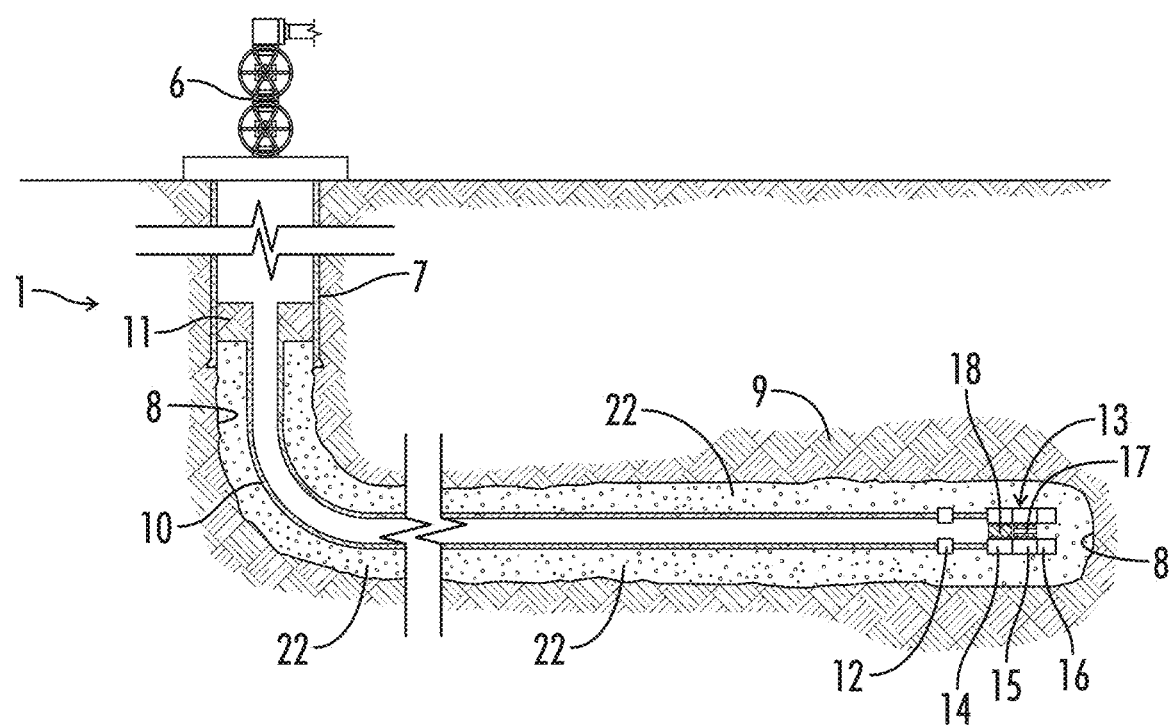
FIG. 1C is a schematic illustration of liner 10 cemented in bore 4 of well 1.

Pumping will continue until cement 22 completely fills the annulus between liner 10 and bore 8. It then will be allowed to set, as seen in FIG. 1C. Cement 22 now helps to support liner 10 in well bore 8 and forms a complete seal around liner 10. Derrick 2 and cementing head 3 have been replaced by a well head 6. Well head 6 may be used in s conducting other well operations, such as fracturing or other stimulation operations.

It will be noted that methods and systems for cementing operations are complex and varied. FIG. 1 are greatly simplified schematic representations of a common cementing operation. Production liner 10 is shown only in part as such liners may extend for a substantial distance. It also will be appreciated that the course of the well bore may not necessarily be as depicted schematically in FIG. 1. Depending on the location and, orientation of the hydrocarbon bearing formation to be accessed, the course of the well bore may be vertical, or more or less deviated in any number of ways.

FIG. 1 also depict cementing of a liner and, more specifically, a production liner which may be used to stimulate and produce hydrocarbons from the well. A "liner," however, can have a fairly specific meaning within the industry, as do "casing" and "tubing." In its narrow sense, a "casing" is generally considered to be a relatively large tubular conduit, usually greater than 4.5" in diameter, that extends into a well from the surface. A "liner" is generally considered to be a relatively large tubular conduit that does not extend from the surface of the well, and instead is supported within an existing casing or another liner. It is, in essence, a "casing" that does not extend from the surface. "Tubing" refers to a smaller tubular conduit, usually less than 4.5" in diameter. The novel fluids and operations, however, are not limited in their application to liners as that term may be understood in its narrow sense. They may be used to advantage in liners, casings, tubing, and other tubular conduits or "tubulars" as are commonly employed in oil and gas wells. Thus, "liners" as used herein will be understood as referring to all such tubulars.

The fluid delivery system also has been greatly simplified, as have cementing procedures. For example, a fluid "train" consisting of pads of additional fluids other than cleaning fluid 20 and cement 22 often are used in cement jobs. A pad of fluid may be pumped into the well under turbulent flow to "flush" the well. The liner also may incorporate other tools to assist in the process, such as return flow diverters which allow fluid returning up the annulus to flow past the liner hanger. The cleaning fluid may or may not be circulated completely out of the well. It is believed the novel fluids may be used in the context of many known systems and methods for cementing a well. An appropriate system and method may be selected with routine effort by workers in the art. Nevertheless, it is believed the methods and systems described herein will provide an understanding of the broader context in which the novel fluids may be used.

The novel cleaning fluids are aqueous fluids. Broader embodiments comprise fluids having a weighting agent, a suspending agent, and nut shell particulates. In other embodiments, the fluids may comprise surfactants or other components. As discussed further below, it is believed that adding nut shells to otherwise conventional spacers used to displace synthetic and oil-based fluids prior to cementing the well will enhance the ability of the fluid to remove oily residue from the liner and formation. Thus, it is expected that the resulting cement sheath will form a more intimate, continuous bond with those surfaces.

Base Fluid

The base fluid of the cleaning fluids used in the novel methods primarily serves to provide weight and to transport other components into the well. The base fluid is water, and it will be understood that water will include fresh water and salt water. "Salt water" as used herein may include unsaturated salt water or saturated salt water "brine systems", such as a NaCl, or KCl brine, as well as heavy brines including $CaCl_2$), $CaBr_2$, and $KCO_2H$.

The base fluid will constitute a substantial portion of the fluid. For less dense fluids, often referred to as "lighter" fluids, it will represent a larger portion, up to 95 to 99 percent by weight (wt %). As the density of the fluid increases, or as it becomes "heavier," the base fluid will represent a smaller portion, perhaps as low as 30 to 40 wt %. The exact proportion of base fluid, however, will depend on the target density for a particular fluid. The amount of water generally will be coordinated with the other components to provide a specific density. One of ordinary skill in the art, with the benefit of this disclosure, will recognize the appropriate amount to use for a chosen application.

Weighting Agents

The cleaning fluids used in the novel methods comprise a weighting agent. Weighting agents serve to increase the density of the fluid. They generally will be added in amounts designed to provide the fluid with a target density, for example, as may be required to displace fluids already present in a well. Typical densities will be from about 9 to about 16 ppg, with densities of from about 9.5 to 12.5 being more common. Thus, weighting agents generally will be loaded in amounts from about 1 to about 450 pounds per U.S. oil barrel (ppb).

For lighter fluids, less dense weighting agents such as silica flour, fly ash, and pumice may be added. At higher loadings, less dense weighting agents may make the fluid unacceptably viscous and difficult to pump. That typically will occur at around 250 to 350 ppb and beyond. Thus, if a cleaning fluid for an application requires a heaver fluid, more dense weighting agents will have to be added to the fluid, such as calcium carbonite, barite, hematite, ilmenite, manganese oxide, tri-manganese tetra oxide, and iron oxide Those and a variety of other weighting agents and their properties are well known and are commercially available from many sources. In general, the cleaning fluids used in the novel methods can include any of the weighting agents conventionally used in aqueous spacers. Workers in the art, however, with the benefit of this disclosure, will be able to select an appropriate weighting agent and loading sufficient to achieve a desired density.

It also will be appreciated that every component in a fluid makes a certain contribution to the resulting density of the fluid. Likewise, a weighting agent may provide additional beneficial properties at the same time that it is used to control density. For example, as disclosed in applicant's U.S. patent application Ser. No. 15/671,907, filed Aug. 8, 2017, using pumice as a weighting agent can improve the rheological stability of a spacer fluid. Workers in the art, however, generally recognize weighting agents as solid, particulate components that are added to a base fluid for the primary purpose of controlling its density.

Suspending Agent

The cleaning fluids used in the novel methods comprise a suspending agent. The suspending agent primarily serves to enhance the viscosity and yield point of the cleaning fluid such that it is capable of suspending the weighting agent and other particulates and displacing fluids in the well, preferably with minimal mixing. Accordingly, it may be selected from many conventional agents used to thicken aqueous fluids. Polymers which hydrolyze when mixed with water are a common type. As the polymer is hydrolyzed, the base fluid becomes thicker and better able to maintain solid particulates in suspension.

Such polymers include natural gums, such as welan, gellan, xanthan, diutan, and galactomannan gums. Welan gum is an exopolysaccharide produced by fermentation of sugar by the bacteria *Sphingonionas* sp. ATCC 31555. The molecule consists of repeating tetrasaccharide units with single branches of L-mannose or L-rhamnose. Gellan gum is a water-soluble anionic polysaccharide produced by the bacterium *Sphingomonas elodea* (formerly *Pseudomonas elodea*). The repeating unit of the polymer is a tetrasaccharide, which consists of two residues of D-glucose, a residue of L-rhamnose, and a residue of D-glucuronic acid connect by glycosidic bonds. Xanthan gum is a polysaccharide produced by the bacterium *Xanthomonas campestris*. It has a $C_{35}H_{49}O_{29}$ monomer. Diutan gums are heteropolysaccharides produced by the bacterium *Sphingomonas* sp. ATCC 53159. It is a tetrasaccharide, having four sugars in the backbone (glucose-glucuronic acid-glucose-rhamnose) and a side chain of two rhamnose residues attached to one of the glucose residues. Galactomannan gums are neutral, water-soluble polysaccharides consisting of a mannose backbone with galactose side groups. More specifically, they typically consist of a $\beta$-(1→4) linked D-mannopyranose backbone with $\alpha$-(1→6) linked galactopyranose side chains. They may be characterized by their mannose-to-galactose ratio, and include, in order of increasing ratio: fenugreek gum (~1:1), guar gum (~2:1), tara gum (~3:1), and locust bean gum or carob gum (~4:1). Chitosans and starches also may be suitable.

Synthetic polymers also may be used, such as high molecular weight hydroxyethyl cellulose (HEC), polyacrylate, polymethacrylate, polyethyleneimine, polyacrylamide, polyvinyl alcohol, and polyvinylpyrrolidone. Copolymers and other derivatives of such natural and synthetic polymers also hydrolyze in water. Derivatives of galactomannan gum, for example, include various copolymers thereof, such as hydroxypropyl guar (HPG) and carboxymethyl hydroxypropyl guar (CMHPG). In accordance with this aspect of the disclosure, the term "copolymer," as used herein, is not limited to polymers comprising two types of monomeric units, but is meant to include any combination of monomeric units, e.g., terpolymers, tetrapolymers, and the like.

Thus, in various embodiments the suspending agents preferably are selected from the group consisting of welan gum, gellan gum, xanthan gum, diutan gum, and galactomannan gum, including guar, tarn, and carob gum, and HEC, and derivatives thereof, including HPG and CMHPG, and mixtures thereof. In this regard, it will be appreciated that in referencing a group "consisting of," it shall be understood that the reference is not only to the listed members, but to any and all subsets of the listed members.

Other suitable suspending agents may include gelatins and clays. Suitable clays include kaolinites, montmorillonite, bentonite, hydrous micas, attapulgite, sepiolite, and the like, as well as synthetic clays, such as laponite.

The suspending agents may be derived from natural products or synthesized by methods known to workers in the art. They also are commercially available, typically in the form of a dried powder, from many commercial producers and distributors of chemical products.

The suspending agent generally will be added in amounts sufficient to provide the viscosities required for a particular application as determined by routine effort. By weight, it is a relatively small component of the fluids. The amount of suspending agent, however, may vary significantly. Using natural gums as an example, the viscosity of the fluid generally is increased by increasing the polymer concentration. It may be more cost effective, however, to increase or decrease the viscosity of the fluid by using, respectively, higher or lower molecular weight polymers.

For the most part, the amount of suspending agent will be fairly closely correlated to the amount of weighting agent and, therefore, the density of the fluid. In general, as more weighting agents are added, more polymer will be required to keep the particulates in suspension. At higher densities, the particulate matter already in suspension tends to support other particulates. Somewhat less polymer relative to the amount of solids may be required. At lower densities, however, the amount of suspending agent may be higher relative to the amount of weighting agent. Even if relatively little polymer is required to suspend the particulate matter, the suspending agent will be needed to control free water. The fluid also will still require a minimum viscosity in order to displace fluids.

Bearing the foregoing in mind, however, in general the suspending agent may be loaded into the fluid in amounts from about 0.02 to about 0.2 ppb (about 0.2 wt % to about 2 wt %). Preferably, it may be loaded in amounts from about 0.03 to about 0.15 ppb (about 0.25 to about 1 wt %). The precise loading of suspending agent for a particular application will be determined by the degree of viscosity to be imparted to the fluid and may be determined by routine effort.

It also will be appreciated, however, that the suspending agent may contribute to or enhance other properties of the cleaning fluid. For example, in certain formations such as shale, the suspending agent also may help minimize fluid losses into a formation by forming a relatively impermeable film or filter cake on the formation surface.

Surfactant

The cleaning fluids used in the novel methods preferably comprise a surfactant. The surfactant primarily serves to help remove oily residues left by fluids in the well, especially synthetic and oil-based fluids, and to water-wet the liner and wellbore surfaces. Cement is able to better adhere to the surfaces. The surfactant also helps to emulsify hydrocarbon droplets and to suspend hydrocarbon-coated particulates in the aqueous fluid so that they may be transported out of the annulus. Thus, the cleaning fluids generally will include a surfactant when they are used to clean the annulus after synthetic and oil-based muds have been used. When water-based drilling muds are used, however, a surfactant may not be necessary to provide adequate cleaning.

The surfactant may be selected from many conventional water compatible surfactants used in spacer fluids, especially those intended to displace synthetic and oil-based fluids. Such surfactants have hydrophilic and hydrophobic moieties and may be either anionic or non-ionic. Suitable surfactants generally may be selected from the group consisting of alkanol amides, ethoxylated alkylarylsulfonates, amine oxides, ethoxylated amines, ethoxylated amides, sulfates and sulfonates of ethoxylated alcohols, ethoxylated alkyl phenols, sulfates or sulfonates of ethoxylated alkyl phenols (and their salts), ethoxylated quaternary ammonium chlorides, fluorocarbon-based surfactants, sulfates or sulfonates of alkanols, coco fatty betaines, condensation products of ethylene oxide and glycols, such as propylene glycol, sulfonated alkyl aldehyde condensates, such as sulfonated naphthalene formaldehyde condensates, sulfonated ketone/acetone formaldehyde condensates, melamine formaldehyde derivatives such as melamine formaldehyde-sodium bi sulfite, sulfonated styrene maleic anhydride copolymers, polyacrylamides, such as polyacrylamide dimethylaminoethyl methacrylate copolymer, sulfonated ketone. Preferred surfactants may be selected from the group consisting of nonylphenol ethoxylates, cocoamido betaine, blends of N-alkyl coco trimethyl ammonium chloride and bis(2-hydroxyethyl) cocoamide oxide, blends of ethoxylated trimethylnonanol and perfluoro quaternary ammonium oxide, C12-C15 linear alcohol ethoxylated sulfate, C9-C11 linear alcohol ethoxylated sulfates, sodium lauryl sulfate, and ethoxy alcohol sulfates.

Nut Shells

The cleaning fluids used in the novel methods comprise particulates of nut shells. The particulates may be derived from the shells of one or more of a variety of nuts, although it will be appreciated that there are various definitions of "nut." "Nuts" are defined botanically as dry, indehiscent, one-seeded fruits similar to achenes but having a seed wall that is greatly thickened and hardened. Examples include the fruit of chestnuts (*Castanea*), beechnuts (*Fagas*), oak (*Quercus*), and hazelnuts (*Corylus*). They are indehiscent fruit, meaning the shell does not split open and the seed is only released when the hard seed wall rots or its otherwise damaged.

Some drupes also are considered "nuts" in a botanical sense. In common parlance, drupes are "stone" fruit. They are indehiscent fruits in which a relatively thin outer skin (the exocarp) and a fleshy or fibrous middle layer (the mesocarp) surrounds a single shell (also referred to as a pit, stone, or pyrene) of hardened endocarp with a seed (kernel) inside. Nut-like drupes or "tryma," such as walnut (*Juglans*) and pecans and other nuts more commonly recognized as hickory (*Carya*), develop extrafloral bracts, or "husks." Tryma will be considered "nuts" as used herein.

The pits of other drupes, such as coffee (*Coffea*), jujube (*Ziziphus jujube*), mango (*Mangifera*), olive (*Olea*), most palms (Arecaceae), including açai (*Euterpe*), date (*Phoenix*), sabal (*Sabal*), coconut (*Cocis nucifera*), and oil palms, pistachio (*Pistacia*), white sapote (*Casimiroa*), cashew (*Anacardium*), and all members of the genus *Prunus*, including almond, apricot, cherry, damson, nectarine, peach, and plum, also may be considered nuts for purposes of the subject invention.

In common parlance a nut is simply a fruit consisting of a hard and woody pericarp or shell around an edible kernel, usually a relatively large, oily kernel. Such culinary nuts include Brazil nuts (*Bertholletia excelsa*) and macadamia nuts (*Macadamia*), and they too will be considered nuts as used herein.

The examples herein show that the addition of black walnut shells, pecan shells, and apricot pits can significantly enhance the cleaning performance of otherwise conventional spacers on a variety of drilling muds. It is believed that other nut shells and mixtures of such nut shells will provide enhancement as well.

Nut shells contain a relatively high proportion of lignin. Lignins are cross-linked phenolic polymers that form the structural backbone of nut shells and provide them with s their hardness and toughness. While chemically similar in composition to wood, nuts shells are much harder than most woods likely because of the three-dimensional arrangement and cross-linking of lignin and their other organic components.

Lignin also is oleophilic, and likely is responsible for a nut shells' ability to adsorb oil residues. Nut shells also typically are highly porous, however, and finely dispersed or suspended oil droplets may become entrained in the particle pores and interstices. At the same time, the particles are not so oleophilic and are tough enough that they can be cleaned of oil and recycled for further use by agitating them violently in a water wash. They also are moderately hydrophilic, and thus may be dispersed and suspended relatively easily in aqueous spacer fluids.

The nut shell particulates may have a more or less spherical shape, or they may irregular and multifaceted shapes. The particulates also may have a surface that is substantially smooth or that is substantially roughened or irregular. Nut shell particulates typically are produced by grinding or crushing the shells, but what shape is typical will vary depending on the material and the specific procedures by which it is produced.

The loading of nut shell particulates also can vary depending primarily on the particular nut shell used, the surfactants used in the spacer fluid, and the particular mud residue that may be encountered. Heavier loadings in general will provide greater cleaning performance. As the examples reported below show, however, an increase in loading may not always produce a corresponding improvement in cleaning. For some base spacer fluids, relatively low loadings will provide such significant improvement in cleaning that higher loadings may simply increase costs without providing much in the way of additional cleaning. With that in mind, nut shell particulates typically will be added to the novel fluids in amounts of at least about 5 ppb. Preferably, they will be added in amounts up to about 200 ppb, up to about 100 ppb, or up to about 50 ppb of nut shell particulates. They may be added, for example, in amounts from about 5 to about 35 ppb.

The nut shell particulates may be somewhat coarse to relatively fine. Preferably, the nut shell particulates will have a size of from about 6 to about 325 mesh (US) (roughly corresponding to a particle size of about 3.4 mm down to about 0.044 mm). In other embodiments, the nut shell particulates will have a size of from about 20 to about 100 mesh (roughly corresponding to about 0.84 mm down to about 0.15 mm), and in still other embodiments they will have a size of from about 30 to about 70 mesh (roughly corresponding to about 0.60 mm down to about 0.21 mm).

It will be appreciated, of course, that commercially available particulate products invariably comprise a distribution of particle sizes. Depending on the way in which they are produced, the distribution of sizes may be greater or lesser, both in the range of sizes and the proportion that each size represents. Nut shell particulates are produced by grinding or crushing. Such processes typically have a large distribution of sizes and tend to produce varying quantities of very tiny particles or "fines."

Commercial nut shell products suitable for use in the novel spacer fluids, however, typically are sold and sized by sifting the particulates through screens having openings of defined sizes. That sizing will substantially eliminate larger sized particles, but particles passing through the screen still will have a range of particle sizes. For example, particulates sold as 50 mesh will have particle sizes from about 0.3 mm or less. A higher mesh size (smaller particle size) may be specified. A $^{50}/_{100}$ mesh product thus would comprise in large part particles of from about 0.3 to about 0.15 mm. The particulates, however, still will comprise a range of sizes falling within those limits. It also will be understood that sifting of particulates is not completely effective in sizing particles. Thus, particulates sold as $^{50}/_{100}$ mesh generally indicates that 90% or more of the particles will pass through a 50-mesh screen but will be retained by a 100-mesh screen. Some larger particles may, remain, but especially on the smaller side, the "sized" particulates still will contain some particles outside of specification.

Additives

The novel methods and cleaning fluids are believed to provide significantly better cleaning and removal of oily residues on well surfaces, especially those left by synthetic and oil-based fluids. The novel cleaning methods and fluids, however, may be used in many different wells and in many different operations presenting a variety of conditions. Thus, certain embodiments of the novel methods use cleaning fluids that comprise additives designed to enhance the performance of the fluids in other ways as may be required or desirable for specific applications. Many such additives are known to workers in the art, are commercially available from a number of sources, and in general may be used in the novel fluids provided they are compatible with the other components.

Defoamers preferably will be added to the cleaning fluids used in the novel methods. As their name implies, they hinder and reduce the formation of foam as other components of the cleaning fluids are added to the base fluid. Defoamers typically have a low viscosity and can spread rapidly on foamy surfaces to destabilize the foam lamellas. Defoamers for aqueous systems typically are sold as aqueous emulsions, and a variety of such defoamers, such as silicone-based defoamers, are available commercially.

Examples of other additives include fluid loss control additives, dispersants, salts, corrosion inhibitors, scale inhibitors, and formation conditioning agents. Preferably, such optional additives will be avoided to the extent that they adversely react with or affect the performance of the primary components of the fluids. It is generally expected that additives of the type used in spacer fluids may be used to provide the novel fluids with additional, advantageous properties. The desirability and compatibility of such conventional additives may be determined by routine experimentation.

Making and Using the Novel Fluids

Various components and their concentrations in the cleaning fluids used in the novel methods are described above. The choice of particular components among those generally suitable for use in the cleaning fluids and the concentration thereof, however, will depend on the precise chemical and physical properties of the fluid that are needed for a particular operation. Cost considerations also may come into play. Workers in the art, having the benefit of this disclosure, may optimize the formulation of the cleaning fluids used for a particular application by reference to principles well known in the art and by routine experimentation.

Moreover, it will be appreciated that various functions and mechanisms have been ascribed to each component of the cleaning fluids and to their effect on the overall properties of the fluid. While such explanations are believed to be accurate, and are believed to provide useful guidance in making and using the cleaning fluids and practicing the novel methods, it will be understood that the invention is not limited thereby. As demonstrated by the examples that follow, regardless of their respective individual properties, the mechanism by which they function, or their effectiveness in other fluids, it can be expected that the inclusion of nut shells in the cleaning fluids provides improved cleaning of the well, especially in cleaning and removal of oily residues left by synthetic s and oil-based muds.

In particular, the cleaning fluids used in the novel methods may include a wide range of otherwise conventional base formulations using many different weighting agents, suspending agents, surfactants, and other additives. It is expected that the addition of nut shells to otherwise conventional spacers will provide improved cleaning when used in the novel methods as compared to its base formulation. More specifically, when circulated in advance of a cement slurry, the cleaning fluids will provide better cleaning of the borehole and liner surfaces, especially in removing oily residue. To the extent that those surfaces are oil-free, the cement can form a stronger, more continuous sheath in the annulus of oil and gas wells.

It will be appreciated that nut shells have been added as so-called lost circulation materials to well fluids such as drilling muds. As a well is drilled, the bore may extend through unconsolidated and other formations that are quite permeable and have relatively low formation pressure. Drilling mud will tend to enter and fill such formations, resulting is what is termed lost circulation. The value of lost drilling mud can be a factor, but the primary issue created by lost circulation is the risk of kicks and blowouts. Rapid influx of fluid into a permeable zone can lower the hydrostatic head of the fluid column in the bore and allow flow—possibly uncontrolled flow of fluids into the well. Significant rig time can be lost dealing with the consequences of lost circulation so various preventive measures preferably are taken.

One approach involves adding lost circulation materials to the fluid to plug openings in the formation and prevent mud from flowing into the formation. Common lost circulation materials include fibrous materials, such as cedar bark, shredded cane stalks, mineral fiber, and hair, flaky materials, such as mica flakes and pieces of plastic or cellophane sheeting, and granular materials, such as ground and sized limestone, marble, wood, Formica, corncobs, and cotton hulls. While ground nut shells also have been used as lost circulation materials, workers in the art have not appreciated the fact that when added to otherwise conventional cement spacers they will provide much more effective cleaning of the annulus, especially when oil-based or synthetic muds have been used to drill the bore.

Moreover, as demonstrated by the examples that follow, workers in the art have not appreciated that the addition of nut shells can provide otherwise conventional spacers with improved stability by increasing the viscosity of the fluid.

In general, the novel cleaning fluids may be made and circulated by methods and equipment well known and used by workers in the art. For example, an aqueous base fluid typically will be stored on site in tanks. A dry mixing unit will be used to mix the weighting agent, suspending agent, and any other dry components, such as a fluid loss control agent or other additive or the dry components may be pre-mixed and transported to the site. The mixture of dry components then will be dispensed into a mixing tank on a hydration unit. The tank is provided with mixers, such as paddles, hydraulic jet mixers, and the like, which blend the dry components into the base fluid. Small amounts of additives, such as weak organic acids, dispersants, and defoamers, may be added to assist in that process. Hydraulic pumps will be used to energize the fluid and to discharge it into a cementing head, such as cementing head 3 shown in FIGS. 1A and 1B. Cementing head 3 also will divert returning fluids into, for example, retention pit 5 for treatment, reconstitution, or disposal.

The fluid may be made in batches, but typically it will be formulated "on the fly." That is, dry mixed solids will be added continuously to the base fluid as it pumped into and out of the mixing tank. Pumping rates and quantities of fluid pumped also can vary considerably depending on the fluid and the well that will be cemented. In general, however, typical cement jobs will pump from about 15 to about 150 US oil barrels (bbl) (42 gallons) of spacer fluid into the well in advance of a cement slurry. Pump rates will be controlled to avoid creating pressures in the annulus that will lead to fracturing of the formation. Otherwise, the cleaning fluid preferably will be pumped at rates sufficient to create turbulent flow as it passes through the annulus where the cement will be placed, especially when the well has been drilled with oil-based and synthetic drilling muds. They may be pumped under laminar flow, but turbulence in the flow will allow the cleaning fluid to clean the annulus more effectively. In general, the higher the flow rate, the more turbulence will be created in a given well. Similarly, for a given pump rate, flow will be more turbulent through smaller annuli. The degree of turbulence also depends on the rheological properties of the fluid and other known factors. For example, if a low viscosity cleaning fluid is being pumped through very tight annuli, pump rates as low as 1 bbl/min may be sufficient to create turbulent flow. For more typical cement jobs, however, the cleaning fluid generally will be pumped at minimum rates of from about 2 to about 5 bbl/min, and depending on the formation up to about 10 to 13 bbl/min.

Various components of preferred fluids are polymers. It will be appreciated that in accordance with that aspect of the disclosure, the term "copolymer," as used herein, is not limited to polymers comprising two types of monomeric units, but is meant to include any combination of monomeric units, e.g., terpolymers, tetrapolymers, and the like.

Many materials listed as being suitable for use in the preferred fluids, such as surfactants, defoamers, and other additives, also can be used in their dry or unadulterated form. Typically, however, they will be sold for use in aqueous well fluids as liquid formulations with water as the primary solvent. The formulations also may include their own additives to improve solubility or stability, or may include co-solvents such as isopropyl alcohol, glycerin, propylene glycol and others. When specifying the loading of components, where possible, reference had been made to the loading of "pure" components, that is, the active ingredients in a liquid formulation. In many cases, however, formulations are proprietary, and the concentration of active ingredient in the formulation may not be known. In such cases, loadings have been specified in terms of the formulation and not necessarily the active ingredient.

It also will be appreciated that when specifying ranges, such as the loading of nut shells or other components in the novel fluids, such ranges are intended to describe each value in the range and ranges between any two values. For example, if nut shell particulates are is specified as being loaded in amounts from about 3 to about 5 ppb, the range describes loadings of about 3 ppb, about 4 ppb, and about 5 ppb, as well as ranges from about 3 to about 4 ppb and from about 4 to about 5 ppb. Similarly, if the range is specified as less than or more than a loading, it describes inclusive specific and ranges of loadings. Moreover, even when unmodified by "about" or similar terms, numbers referring to a particular quantity, level, or the like shall be understood as including the specified quantity and somewhat smaller and larger quantities as provide substantially the same effect. Likewise, when compositions are described in this disclosure as a group consisting of named compositions, the group may consist of and be claimed as any set or subset of named compositions.

EXAMPLES

The invention and its advantages may be further understood by reference to the following examples. The test fluids included a variety of nut shells, were formulated with different base spacer components and loadings, and were tested on different muds to demonstrate the broad application and performance of nut shells in cleaning fluids. It will be appreciated, however, that the invention is not limited thereto.

Examples—Materials, Equipment, and General Procedures

Aqueous cleaning fluids for the examples that follow were prepared using the following components:

Base fluid. Tap water from Tomball, Tex.

Suspending agent (SA) 1. Diutane gum (DG) commercially available as a dried powder under the product name GW-86 from BJ Services, Houston, Tex.

Suspending agent (SA) 2. Welan gum (WG) comprising 35 wt % welan gum and 65 wt % crystalline silica. It is commercially available as a dried power under the product name ASA-301 from BJ Services, Houston, Tex.

Weighting Agent (WA)—Silica Flour (SF). Two hundred (200) mesh silica flour commercially available Rockwater Energy Solutions, Houston, Tex.

Weighting agent—Fly Ash (FAC). Class C fly ash obtained from Rockwater Energy Solutions and other U.S. suppliers.

Weighting agent—Fly Ash (FAF). Class F fly ash obtained from various U.S. suppliers.

Weighting agent—Barite (B). Barite or barium sulfate commercially available from Benchmark, Baker Hughes, Houston, Tex. (www.shopbakerhughes.com), or Cimbar Performance Minerals, Chatsworth, Ga. (cinbarcom).

Surfactant 1 (S1). A non-ionic surfactant commercially available from BJ Services under the product name Plexaid SS-201.

Surfactant 2 (S2). A surfactant blend commercially available from BJ Services under the product name SS-6 (XSS-2).

Surfactant 3 (S3). A 50:50 mix of surfactant blends commercially available from BJ Services under the product names SS-247 and SS-267.

Surfactant 4 (54). A surfactant blend commercially available from BJ Services under the product name FBS-80.

Defoamer. A liquid defoamer commercially available from BJ Services under the product name FP-6L.

Black Walnut Shells. Crushed black walnut shells having a $20/100$ mesh size commercially available from Hammonds Products Company, Stockton, Mo. (www.black-walnuts.com).

Pecan Shells. Crushed pecan shells having a $30/60$ mesh size commercially available from Hammonds Products Company.

Apricot Pits. Ground apricot pits having a $40/70$ mesh size obtained commercially from The Gourmet Rose (https://www.etsy.com/shop/thegourmetrose?ref=12-shopheader-name).

Drilling Mud 1. A synthetic based mud formulated to a density of 10.7 ppg.

Drilling Mud 2. An oil-based mud formulated to a density of 9.4 ppg.

Drilling Mud 3. An oil-based mud formulated to a density of 10.7 ppg.

Drilling Mud 4. An oil-based mud formulated to a density of about 13 ppg.

Drilling Mud 5. An oil-based mud formulated to a density of 10.2 ppg.

Preparation of Fluids. Aqueous test fluids were prepared using a variable speed mixer sold by Chandler Engineering, Tulsa, Okla. (chandlering.com) using various multi-blade mixer paddles. The dry components, namely, the weighting agent (silica flour (SF), Class C fly ash (FAC), or a mixture of Class F fly ash and barite (F ARB), suspending agent (diutane gum (DG) or welan gum (WG)), and nut shells (black walnut shells (BWS) or pecan shells (PC)), were dry blended together. About 400 ml of base fluid was poured into a plastic tub, and the defoamer was added. The dry-blended components then were added to the fluid, after which was added the surfactant (S1, S2, S3, or S4).

The fluid was mixed at a rate sufficient to maintain a vortex (typically from about 500 to about 1,000 rpm) for a period of about 4 to 8 minutes. Thicker test fluids were mixed at somewhat higher rates and for somewhat longer times. Mixing was terminated when all components were adequately suspended and homogeneous.

Various test fluids were prepared as described above. The density, the components, and amounts of each component for each fluid are set forth in FIG. 2. Density is reported in ppg. Component loadings are provided in pounds per barrel (ppb) and gallons per barrel (gpb).

Cleaning Performance of Fluids—Visual Evaluation. The cleaning performance of test fluids on different synthetic and oil-based muds was visually evaluated as reported in the Examples below. The fluids were rotor tested by general procedures widely used in the industry to evaluate drilling mud removal. More specifically, the rotor testing used a stainless-steel, open cylindrical viscometer sleeve obtained from Grace Instrument Company, Katy, Tex. The sleeve is intended to simulate a metal well tubular. Typically, a well tubular will experience some abrasion as it is run into a well, especially an open borehole. Thus, the normally smooth sleeve was roughened to a degree similar to or exceeding that experienced in the field so as to allow mud to adhere more easily and provide more stringent test conditions.

The roughened sleeve was attached to a Model M3600 automatic viscometer sold by Grace Instrument. A cup containing approximately 200-210 ml of drilling mud at room temperature then was raised around the sleeve. The sleeve was rotated at 20 rpm for approximately 2 minutes to allow mud to accumulate on and fully cover the sleeve. Given its roughened surface, mud was strongly adhered to the sleeve.

A cup containing approximately 200-210 ml of test spacer fluid then was raised around the sleeve. The sleeve was rotated in the test fluids at 150 rpm for approximately 10 minutes. The cup of test fluid was replaced with a cup of water, and the sleeve was rotated in water at 150 rpm for another 10 minutes to displace the spacer covering the sleeve. The sleeve then was visually inspected, and the degree of cleaning was evaluated.

Cleaning Performance of Fluids—Quantitative Analysis. The cleaning performance of test fluids on different synthetic and oil-based muds was quantitatively analyzed as reported in the Examples below. The fluids were tested as in the visual evaluation described above except as follows.

The clean, dry weight was recorded. The sleeve then was "muddied" as described above. After rotation in mud, the cup of mud was lowered until the sleeve was situated just above the fluid level. The sleeve then was rotated at about 100 rpm for about 4 minutes s to spin off loosed mud, except for testing with the heavier 13 ppg oil-based mud. It was spun at 300 rpm.

The muddy sleeve then was removed for weighing. The bottom of the sleeve was wiped, the sleeve was shaken, and turned upside down on the scale to avoid fluids running off the sleeve as it was weighed.

The muddy sleeve, after having been weighed, then was reattached to the viscometer and was cleaned as described above for the visual evaluation. The cleaned sleeve was placed in an oven at 190° F. for about 10 minutes to evaporate excess water. The final weight of the cleaned sleeve then was recorded. The weight of the clean, dry sleeve was deducted from the weight of the muddy and cleaned sleeve to quantify the degree of cleaning.

Viscosity Over Shear Rate. The viscosity of test fluids at various shear rates was measured as reported in the Examples below. The test fluids were tested using the Grace Model M3600 automatic viscometer. The viscometer is a concentric cylinder viscometer using a rotating sleeve and a stationary bob. The sleeve was an R1 rotor with a radius of 1.8415 cm. The bob was a B1 bob having a radius of 1.7245 cm and a height of 3.80 cm. Test procedures and data acquisition are controlled by a computer running Grace M3600DAQ™ software. The viscometer was calibrated prior to testing using a test fluid having a viscosity of 200 centistokes (cst) obtained from Grace Instniments according to the manufacture's standard calibration procedures.

Fluids were tested at a temperature between 65-75° F., i.e., at room temperature. After preparation, approximately 200-210 ml of test fluid was added to the sample cup, filling the sample cup to a level a few inches above the top of the bob.

The fluids were tested at ambient pressure and at various shear rates starting at 3 rpm, and then to 6 rpm, 30 rpm, 60 rpm, 100 rpm, 200 rpm, 300 rpm, and 600 rpm. The shear rate was held steady at each level for approximately 10 seconds before adjusting the rate upward. Shear rates were controlled automatically by the Grace viscometer. Viscosity was recorded at the end of each 10 second hold interval. Because the Grace viscometer is "direct-indicating," viscosity was recorded in widely utilized Fann 35 dial readings ("FDR").

Example 1

The cleaning performance of a first flight of novel test fluids on Mud 1, a 10.7 ppg synthetic based drilling mud, was evaluated visually in accordance with the procedures described above. All test fluids included black walnut shells, but were formulated with different base spacer components or loadings to verify improved performance across different conventional spacer designs.

Specifically, the fluids tested were novel fluids 2, 4, 5, 7, 8, 11, 12, and 13. All test fluids were compared to a control fluid of the same density and having the same base spacer components, but without nut shells: fluids 2C, 4C, 5C, 7C, 5C, 11C, 12C, and 13C.

Performance of the test fluid was evaluated visually and rated compared to its control fluid. A rating of 2 indicates superior cleaning over the control fluid. That is, the test fluid with nut shells removed at least 50 to 70% more mud than its control fluid without nut shells. A rating of 1 indicates improved cleaning, that is, the test fluid with nut shells removed at least 10 to 20% more mud than its control fluid without nut shells. A rating of 0 indicates that the test fluid with nut shells cleaned about as well as its control fluid without nut shells.

The results of the evaluation are set forth below in Table 1.

TABLE 1

Cleaning of Mud 1 (10.7 ppg Synthetic Based)

| Fluid | Density (ppg) | Weighting Agent | Suspending agent | Surfactant | Nut Shells | Rating |
|---|---|---|---|---|---|---|
| 2 | 12 | SF | DG | 1 | BWS | 2 |
| 4 | 12 | FAC | WG | 1 | BWS | 2 |
| 5 | 12 | FAC | WG | 1 | BWS | 1 |
| 7 | 12 | SF | DG | 2 | BWS | 2 |
| 8 | 12 | SF | DG | 1 | BWS | 2 |
| 11 | 12 | SF | DG | 3 | BWS | 0 |
| 12 | 12 | SF | DG | 3 | BWS | 2 |
| 13 | 12 | SF | DG | 3 | BWS | 1 |

It will be noted that the control fluids used different base components, namely, different weighting agents (silica flour or fly ash), different suspending agents (diutane gum or welan gum), and different surfactants (Nos. 1, 2, or 3). Nevertheless, with a single exception, the addition of walnut shells to a control fluid provided improved or superior cleaning of Mud 1, a synthetic based mud. Most test fluids exhibited superior cleaning.

It will be noted that while fluid 11 showed no significant improvement in cleaning, the same fluid (fluid 12) with higher loadings of walnut shells (27 ppb vs. 13.5 ppb) showed superior cleaning, and the same fluid (fluid 13) with lower loading of surfactant (0.25+0.25 gpb vs. 0.5+0.5 gpb) showed improved cleaning. It also will be noted that fluid 5 had improved cleaning while the same fluid (fluid 4) with increased loading of surfactant (0.5+0.5 gpb vs. 0.25+0.25 gpb) had superior cleaning.

Example 2

The cleaning performance of a second flight of novel test fluids on Mud 2, a 9.4 ppg oil-based drilling mud, was evaluated visually in accordance with the procedures described above. All test fluids included black walnut shells, but were formulated with different base spacer components to verify improved performance across different conventional spacer designs.

Specifically, the fluids tested were novel fluids 1, 6, and 10. They were compared to control fluids having the same density and base spacer components, but without nut shells: fluids 1C, 6C, and 10C.

Performance of the test fluids as compared to their control fluids was evaluated visually and rated as in Example 1. The results of the evaluation are set forth below in Table 2.

TABLE 2

Cleaning of Mud 2 (9.4 ppg Oil-based)

| Fluid | Density (ppg) | Weighting Agent | Suspending agent | Surfactant | Nut Shells | Rating |
|---|---|---|---|---|---|---|
| 1 | 11 | SF | DG | 1 | BWS | 2 |
| 6 | 11 | SF | DG | 2 | BWS | 1 |
| 10 | 12 | SF | DG | 3 | BWS | 2 |

It will be noted that the control fluids had different densities and used different surfactants (Nos. 1, 2, or 3). Nevertheless, the addition of walnut shells to all those control fluids provided improved or superior cleaning of Mud 2, an oil-based mud. Most exhibited superior cleaning.

Example 3

The cleaning performance of a third flight of novel test fluids on Mud 3, a 10.7 ppg oil-based drilling mud, was evaluated visually in accordance with the procedures described above. All test fluids included black walnut shells, but were formulated with different base spacer components or loadings to verify improved performance across different u conventional spacer designs.

Specifically, the fluids tested were novel fluids 2, 7, 11, and 12. They were compared to control fluids having the same density and base spacer components, but without nut shells: fluids 2C, 7C, 11C, and 12C.

Performance of the test fluids as compared to their control fluids was evaluated visually and rated as in Example 1. The results of the evaluation are set forth below in Table 3.

TABLE 3

Cleaning of Mud 3 (10.7 ppg Oil-based)

| Fluid | Density (ppg) | Weighting Agent | Suspending agent | Surfactant | Nut Shells | Rating |
|---|---|---|---|---|---|---|
| 2 | 12 | SF | DG | 1 | BWS | 1 |
| 7 | 12 | SF | DG | 2 | BWS | 2 |
| 11 | 12 | SF | DG | 3 | BWS | 0 |
| 12 | 12 | SF | DG | 3 | BWS | 2 |

It will be noted that the control fluids used different surfactants (Nos. 1, 2, or 3). Nevertheless, with a single exception, the addition of walnut shells to all those control fluids provided improved or superior cleaning of Mud 3, an oil-based mud. It will be noted that while fluid 11 showed no significant improvement in cleaning, the same fluid (fluid 12) with higher loadings of walnut shells (27 ppb vs. 13.5 ppb) showed superior cleaning.

It also will be noted that fluids 2, 7, and 12 also showed superior cleaning of Mud 1 as reported in Example 1.

Example 4

The cleaning performance of a fourth flight of novel test fluids on Mud 4, an approximately 13 ppg oil-based drilling mud, was evaluated visually in accordance with the procedures described above. All test fluids included black walnut shells, but were formulated with different base spacer components.

Specifically, the fluids tested were novel fluids 3 and 14. They were compared to control fluids having the same density and base spacer components, but without nut shells: fluids 3C and 14C.

Performance of the test fluids as compared to their control fluids was evaluated visually and rated as in Example 1. The results of the evaluation are set forth below in Table 4.

TABLE 4

Cleaning of Mud 4 (13 ppg Oil-based)

| Fluid | Density (ppg) | Weighting Agent | Suspending agent | Surfactant | Nut Shells | Rating |
|---|---|---|---|---|---|---|
| 3 | 14 | FAF/B | WG | 1 | BWS | 2 |
| 14 | 14 | FAF/B | WG | 3 | BWS | 2 |

It will be noted that the control fluids used different surfactants (Nos. 1 or 3). Nevertheless, the addition of walnut shells to all those control fluids provided superior cleaning of Mud 4, an oil-based mud.

Example 5

The cleaning performance of another flight of novel test fluids on Mud 3, a 10.7 ppg oil-based drilling mud, was evaluated visually in accordance with the procedures described above. All test fluids had the same base spacer components and included black walnut shells, but the loading of black walnut shells was varied.

Specifically, the fluids tested were novel fluids 11, 15, 12, and 16. The test fluids were compared to a control fluid of the same density and having the same base spacer components, but without nut shells: fluid 11C.

Performance of the test fluids as compared to their control fluid was evaluated visually and rated as in Example 1.

The results of the evaluation are set forth below in Table 5.

TABLE 5

Cleaning of Mud 3 (10.7 ppg Oil-based)

| Fluid | Density (ppg) | Weighting Agent | Suspending agent | Surfactant | Walnut Loading (ppb) | Rating |
|---|---|---|---|---|---|---|
| 11 | 12 | SF | DG | 3 | 13.5 | 0 |
| 15 | 12 | SF | DG | 3 | 20.25 | 2 |
| 12 | 12 | SF | DG | 3 | 27 | 2 |
| 16 | 12 | SF | DG | 3 | 33.75 | 2 |

It will be noted that test fluid 11, which had the lowest loading of walnut shells (13.5 ppb), showed no significant improvement in cleaning. Increased loading of walnut shells, however, resulted in superior cleaning. The performance of fluid 15 with 20.25 ppb loading was so thorough that little incremental improvement in cleaning was observed with fluids 12 and 16 having higher loadings (27 ppb and 33.74 ppb, respectively).

It also will be noted that fluid 12 also showed superior cleaning of Mud 1 as reported in Example 1.

Example 6

The cleaning performance of another flight of novel test fluids on Mud 3, a 10.7 ppg oil-based drilling mud, was evaluated visually in accordance with the procedures described above. All test fluids had the same base spacer components as in Example 5. The test fluids, however, included pecan shells at different loadings instead of walnut shells.

Specifically, the fluids tested were novel fluids 17, 18, 19, and 20. The test fluids were compared to a control fluid of the same density and having the same base spacer components, but without nut shells: fluid 11C.

Performance of the test fluids as compared to their control fluid was evaluated visually and rated as in Example 1.

The results of the evaluation are set forth below in Table 6.

TABLE 6

Cleaning of Mud 3 (10.7 ppg Oil-based)

| Fluid | Density (ppg) | Weighting Agent | Suspending agent | Surfactant | Pecan Loading (ppb) | Rating |
|---|---|---|---|---|---|---|
| 17 | 12 | SF | DG | 3 | 13.5 | 1 |
| 18 | 12 | SF | DG | 3 | 20.25 | 2 |
| 19 | 12 | SF | DG | 3 | 27 | 2 |
| 20 | 12 | SF | DG | 3 | 33.75 | 2 |

It will be noted that test fluid 17, which had the lowest loading of pecan shells at 13.5 ppb, still showed improved cleaning. Test fluid 18, which had a loading of 20.25 ppb pecan shells, showed superior cleaning. Test fluids 19 and 20, which had increasing loadings (27 ppb and 33.75 ppb, respectively), showed incremental increases in cleaning.

Example 7

The cleaning performance of another flight of novel test fluids on Mud 1, a 10.7 ppg synthetic based drilling mud, was analyzed quantitatively in accordance with the procedures described above. All test fluids had the same base spacer components, but included walnut shells or pecan shells at different loadings.

Specifically, the fluids tested were novel fluids 21 to 27. Test fluids 21 to 23 had different loadings of black walnut shells (BWS) Test fluids 24 to 27 had different loadings of pecan shells (PS). The test fluids were compared to a control fluid of the same density and having the same base spacer components, but without nut shells: fluid 21C.

Figure 3:
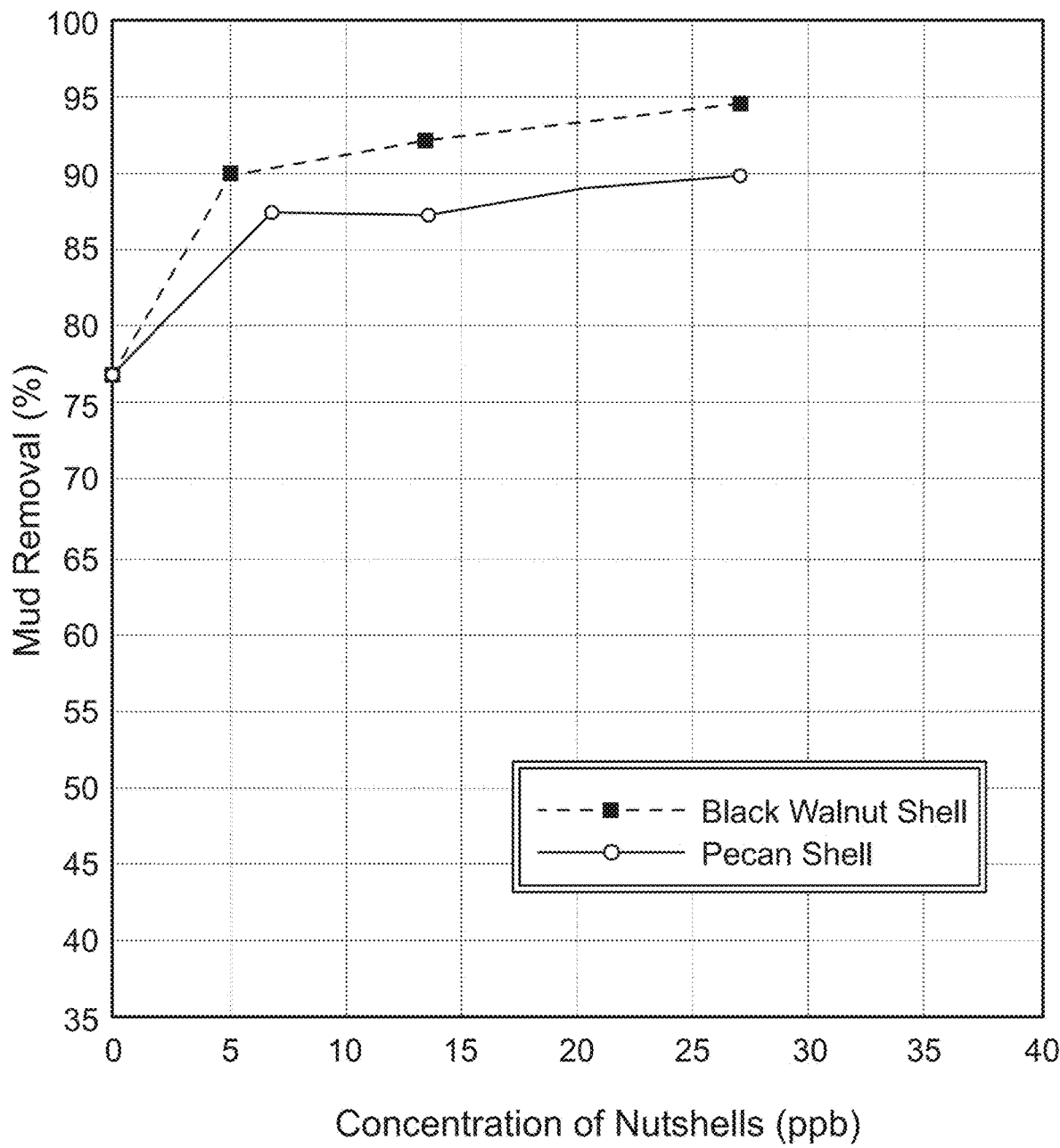
FIG. 3 is a graphical presentation of data collected in Example 7 showing mud removal (%) by a test spacer fluid for various concentrations of nut shells.

The results of the quantitative analysis are set forth below in Table 7 and presented in the graph of FIG. 3.

TABLE 7

Cleaning of Mud 1 (10.7 ppg Synthetic Based)

| Fluid | Density (ppg) | WA | SA | Surfactant | Nut | Nut Loading (ppb) | Cleaning (% removed) |
|---|---|---|---|---|---|---|---|
| 21C | 12 | FAF | WG | 4 | NA | NA | 77.1 |
| 21 | 12 | FAF | WG | 4 | BWS | 5 | 89.8 |
| 22 | 12 | FAF | WG | 4 | BWS | 13.5 | 92.4 |
| 23 | 12 | FAF | WG | 4 | BWS | 27 | 94.3 |
| 24 | 12 | FAF | WG | 4 | PS | 6.75 | 87.5 |
| 25 | 12 | FAF | WG | 4 | PS | 13.5 | 87.4 |
| 26 | 12 | FAF | WG | 4 | PS | 20.25 | 89.3 |
| 27 | 12 | FAF | WG | 4 | PS | 27 | 89.9 |

It will be noted that all test fluids, even at relatively low loadings of nut shells, showed significant improvement in cleaning over the control fluid without nut shells (fluid 21C). The performance at the lowest loadings (fluids 21 and 24) was so thorough that little incremental improvement was shown with increased loadings (fluids 22-23 and 25-27). At all levels, however, black walnut shells exhibited greater improvement in cleaning than did pecan shells.

Example 8

The cleaning performance of another flight of novel test fluids on Mud 2, a 9.4 ppg oil-based drilling mud, was analyzed quantitatively in accordance with the procedures described above. All test fluids had the same base spacer components, but included walnut shells or pecan shells at different loadings.

Specifically, the fluids tested were novel fluids 1 and 28 to 34. Test fluids 1 and 28 to 30 had different loadings of black walnut shells (BWS). Test fluids 31 to 34 had different loadings of pecan shells (PS). The test fluids were compared to a control fluid of the same density and having the same base spacer components, but without nut shells: fluid 1C.

Figure 4:
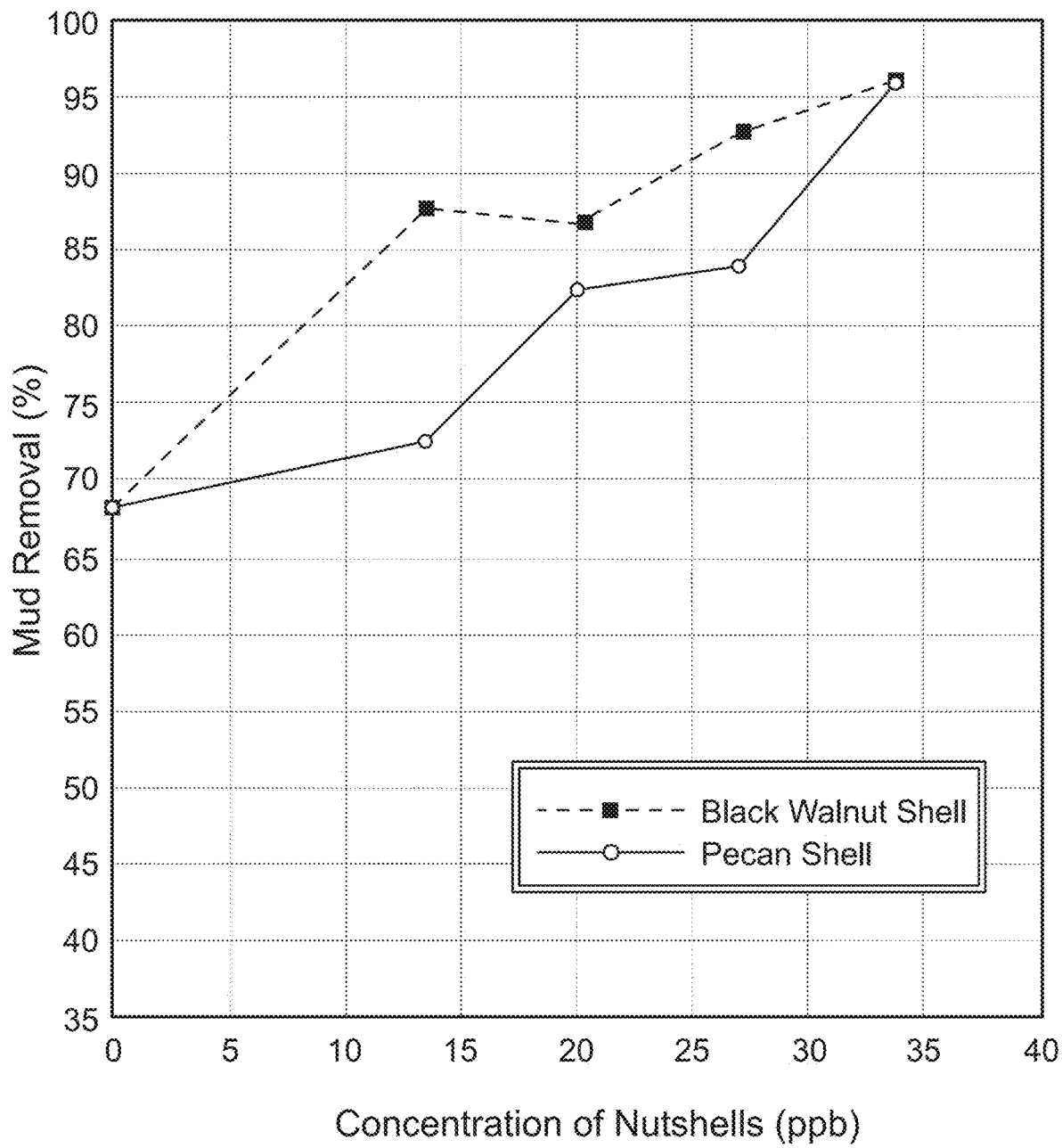
FIG. 4 is a graphical presentation of data collected in Example 8 showing mud removal (%) by a test spacer fluid for various concentrations of nut shells.

The results of the quantitative analysis are set forth below in Table 8 and presented in the graph of FIG. 4.

TABLE 8

Cleaning of Mud 2 (9.4 ppg Oil-based)

| Fluid | Density (ppg) | WA | SA | Surfactant | Nut | Nut Loading (ppb) | Cleaning (% removed) |
|---|---|---|---|---|---|---|---|
| 1C | 11 | SF | DG | 1 | NA | NA | 68.5 |
| 1 | 11 | SF | DG | 1 | BWS | 13.5 | 87.7 |
| 28 | 11 | SF | DG | 1 | BWS | 20.25 | 86.8 |
| 29 | 11 | SF | DG | 1 | BWS | 27 | 92.7 |
| 30 | 11 | SF | DG | 1 | BWS | 33.75 | 96.1 |
| 31 | 11 | SF | DG | 1 | PS | 13.5 | 72.7 |
| 32 | 11 | SF | DG | 1 | PS | 20.25 | 82.6 |

TABLE 8-continued

Cleaning of Mud 2 (9.4 ppg Oil-based)

| Fluid | Density (ppg) | WA | SA | Surfactant | Nut | Nut Loading (ppb) | Cleaning (% removed) |
|---|---|---|---|---|---|---|---|
| 33 | 11 | SF | DG | 1 | PS | 27 | 84 |
| 34 | 11 | SF | DG | 1 | PS | 33.75 | 96.9 |

It will be noted that all test fluids with black walnut shells, even at the lowest loading (fluid 1), showed significant improvement in cleaning over the control fluid without nut shells (fluid 1C). The test fluids with pecan shells, however, did not show significant improvement until loading of 20.25 ppb (fluid 32). Increased loading of both nut shells tended to improve cleaning performance. Although the performance of pecan shells was generally less than that of black walnut shells, at the highest loading (33.75 ppb), the performance of black walnut shells (fluid 30) and pecan shells (fluid 34) was essentially the same.

Example 9

The cleaning performance of another flight of novel test fluids on Mud 5, a 10.2 ppg oil-based drilling mud, was analyzed quantitatively in accordance with the procedures described above. All test fluids had the same base spacer components, but included walnut shells or pecan shells at different loadings.

Specifically, the fluids tested were novel fluids 35 to 42. Test fluids 35 to 38 had different loadings of black walnut shells (BWS). Test fluids 39 to 42 had different loadings of pecan shells (PS). The test fluids were compared to a control fluid of the same density and having the same base spacer components, but without nut shells: fluid 35C.

Figure 5:
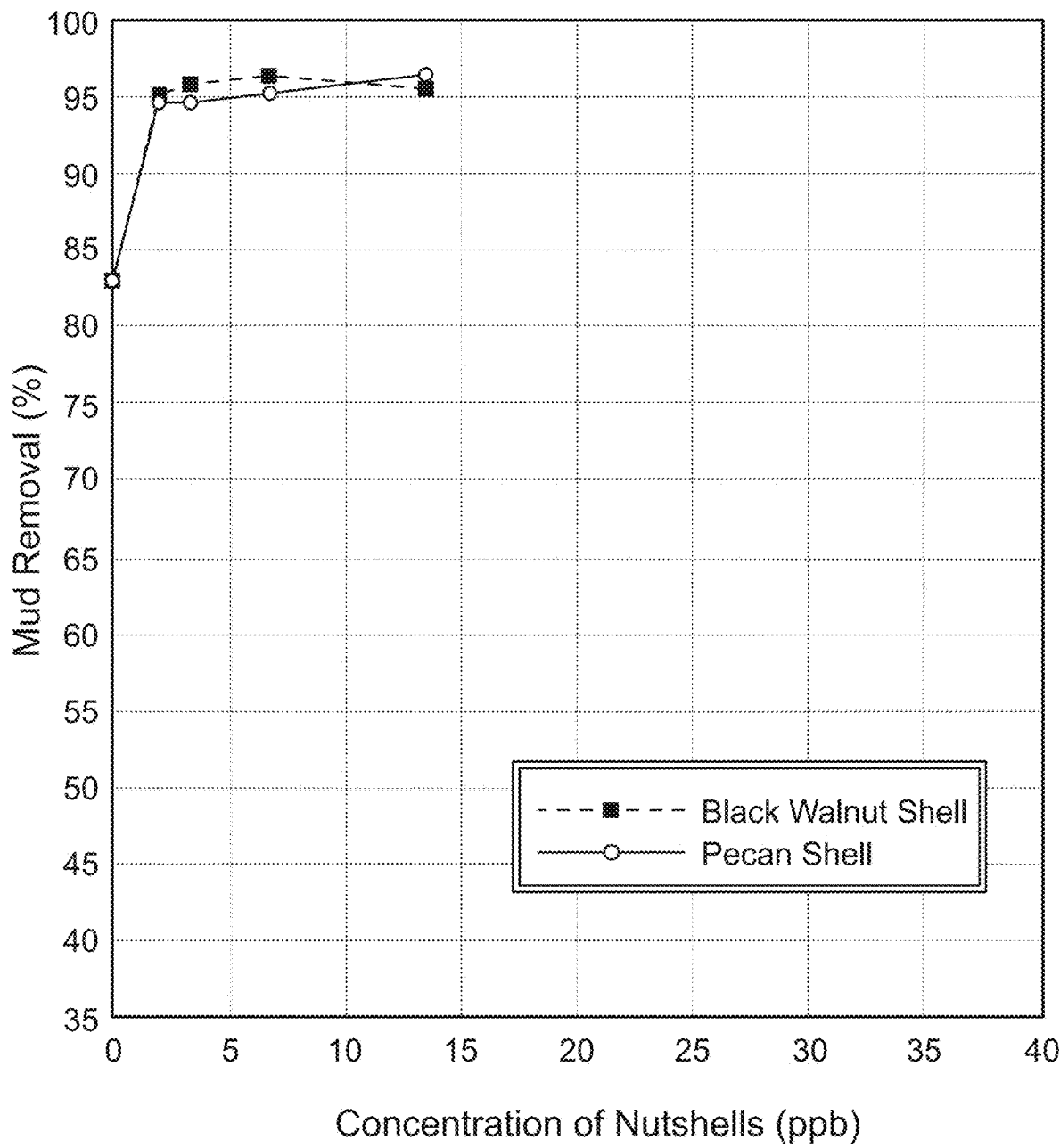
FIG. 5 is a graphical presentation of data collected in Example 9 showing mud removal (%) by a test spacer fluid for various concentrations of nut shells.

The results of the quantitative analysis are set forth below in Table 9 and presented in the graph of FIG. 5.

TABLE 9

Cleaning of Mud 5 (10.2 ppg Oil-based)

| Fluid | Density (ppg) | WA | SA | Surfactant | Nut | Nut Loading (ppb) | Cleaning (% removed) |
|---|---|---|---|---|---|---|---|
| 35C | 11.5 | SF | DG | 2 | NA | NA | 82.8 |
| 35 | 11.5 | SF | DG | 2 | BWS | 2 | 95.1 |
| 36 | 11.5 | SF | DG | 2 | BWS | 3.375 | 95.8 |
| 37 | 11.5 | SF | DG | 2 | BWS | 6.75 | 96.4 |
| 38 | 11.5 | SF | DG | 2 | BWS | 13.5 | 95.5 |
| 39 | 11.5 | SF | DG | 2 | PS | 2 | 94.6 |
| 40 | 11.5 | SF | DG | 2 | PS | 3.375 | 94.6 |
| 41 | 11.5 | SF | DG | 2 | PS | 6.75 | 95.3 |
| 42 | 11.5 | SF | DG | 2 | PS | 13.5 | 96.5 |

It will be noted that all test fluids with nut, even at the lowest loading of 2 ppb (fluids 35 and 39), showed significant improvement in cleaning over the control fluid without nut shells (fluid 35C). The improvement was such that little incremental increase in performance was observed with higher loadings of nut shells. The performance of walnut shells and pecan shells was comparable.

Example 10

The cleaning performance of another flight of novel test fluids on Mud 4, a 13 ppg, oil-based drilling mud, was analyzed quantitatively in accordance with the procedures described above. All test fluids had the same base spacer components, but included walnut shells or pecan shells at different loadings.

Specifically, the fluids tested were novel fluids 43 to 50. Test fluids 43 to 46 had different loadings of black walnut shells (BWS). Test fluids 47 to 50 had different loadings of pecan shells (PS). The test fluids were compared to a control fluid of the same density and having the same base spacer components, but without nut shells: fluid 43C.

Figure 6:
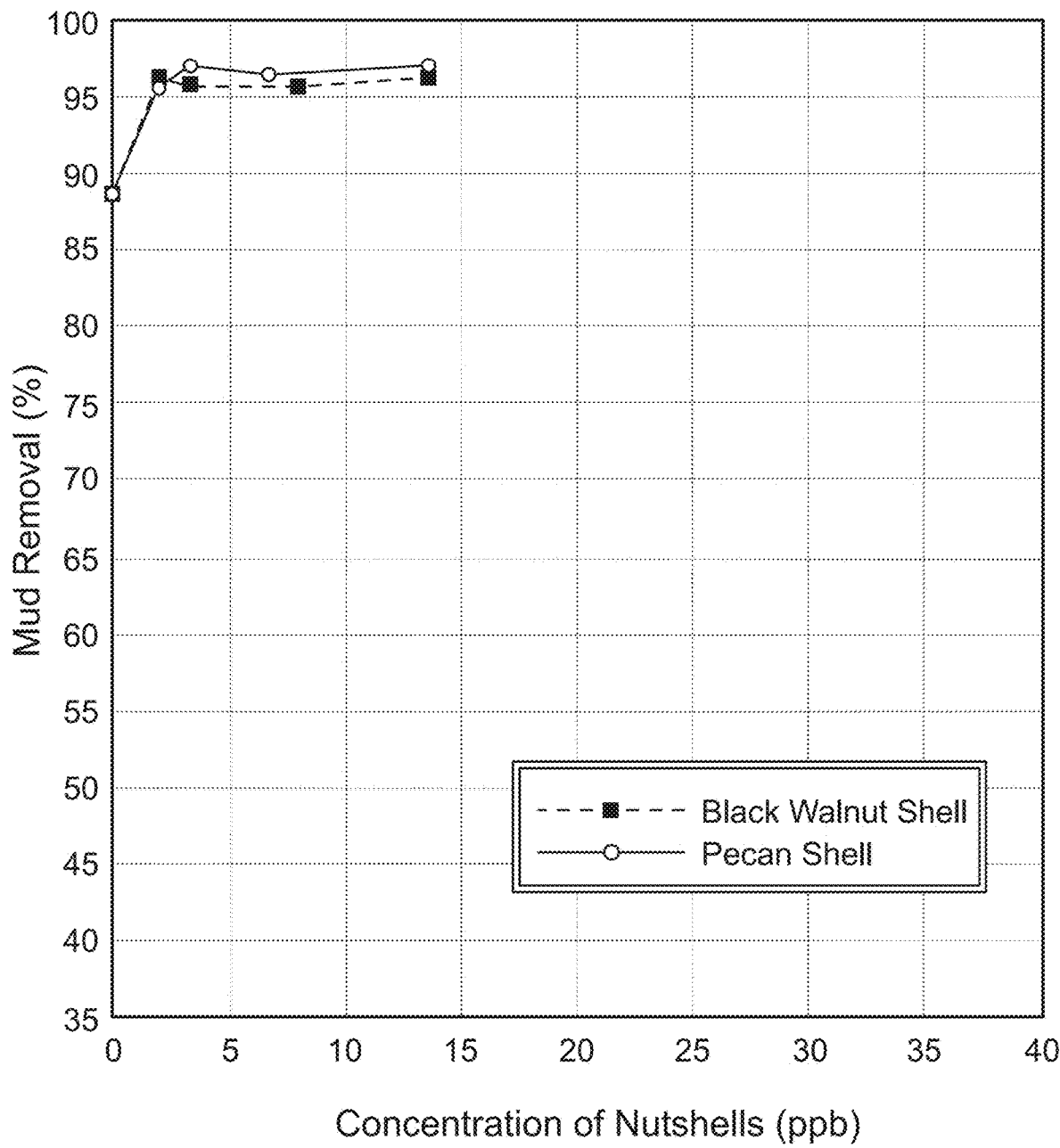
FIG. 6 is a graphical presentation of data collected in Example 10 showing mud removal (%) by a test spacer fluid for various concentrations of nut shells.

The results of the quantitative analysis are set forth below in Table 10 and presented in the graph of FIG. 6.

TABLE 10

Cleaning of Mud 4 (13 ppg Oil-based)

| Fluid | Density (ppg) | WA | SA | Surf. | Nut | Nut Loading (ppb) | Cleaning (% removed) |
|---|---|---|---|---|---|---|---|
| 43C | 14 | FAF/B | WG | 3 | NA | NA | 88.6 |
| 43 | 14 | FAF/B | WG | 3 | BWS | 2 | 96.2 |
| 44 | 14 | FAF/B | WG | 3 | BWS | 3.375 | 95.6 |
| 45 | 14 | FAF/B | WG | 3 | BWS | 8 | 95.6 |
| 46 | 14 | FAF/B | WG | 3 | BWS | 13.5 | 96.2 |
| 47 | 14 | FAF/B | WG | 3 | PS | 2 | 95.6 |
| 48 | 14 | FAF/B | WG | 3 | PS | 3.375 | 97 |
| 49 | 14 | FAF/B | WG | 3 | PS | 6.75 | 96.4 |
| 50 | 14 | FAF/B | WG | 3 | PS | 13.5 | 97 |

It will be noted that all test fluids with nut, even at the lowest loading of 2 ppb (fluids 43 and 47), showed significant improvement in cleaning over the control fluid without nut shells (fluid 43C). The improvement was such that little incremental increase in performance was observed with higher loadings of nut shells. The performance of walnut shells and pecan shells was comparable.

Example 11

The cleaning performance of another flight of novel test fluids on Mud 4, a 13 ppg, oil-based drilling mud, was analyzed quantitatively in accordance with the procedures described above. All test fluids had the same base spacer components, but included apricot pits (AP) at different loadings.

Specifically, the fluids tested were novel fluids 51 to 54. The test fluids were compared to a control fluid of the same density and having the same base spacer components, but without nut shells: fluid 51C.

Figure 7:
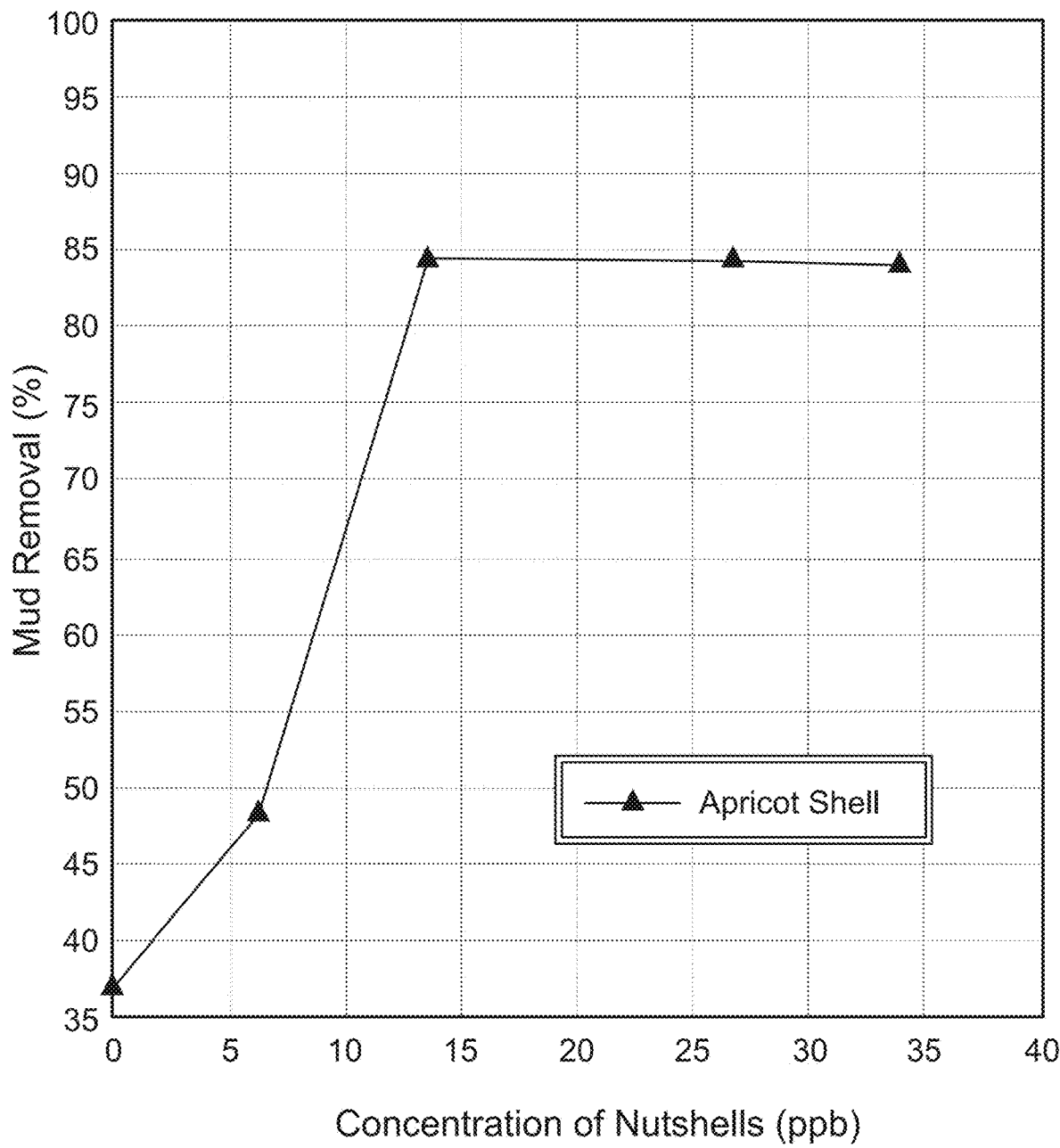
FIG. 7 is a graphical presentation of data collected in Example 11 showing mud removal (%) by a test spacer fluid for various concentrations of nut shells.

The results of the quantitative analysis are set forth below in Table 11 and presented in the graph of FIG. 7.

TABLE 11

Cleaning of Mud 4 (13 ppg Oil-based)

| Fluid | Density (ppg) | WA | SA | Surf. | Nut | Nut Loading (ppb) | Cleaning (% removed) |
|---|---|---|---|---|---|---|---|
| 51C | 14 | SF | WG | 1 | NA | NA | 36.8 |
| 51 | 14 | SF | WG | 1 | AP | 6.25 | 48.4 |
| 52 | 14 | SF | WG | 1 | AP | 13.5 | 84.4 |
| 53 | 14 | SF | WG | 1 | AP | 27.0 | 84.4 |
| 54 | 14 | SF | WG | 1 | AP | 33.25 | 84.0 |

It will be noted that all test fluids with nut, even at the lowest loading of 6.25 ppb (fluid 51), showed significant improvement in cleaning over the control fluid without nut shells (fluid 51C). Even greater improvement was observed at a loading of 13.5 ppb (fluid 52). The improvement was such that little incremental increase in performance was observed with higher loadings of nut shells. Although not as dramatic as with walnut and pecan shells, the cleaning performance of the fluids was greatly enhanced by the addition of apricot pits at higher loadings.

Example 12

The viscosity of another flight of test fluids was measured at room temperature at various shear rates as described above. All test fluids had black walnut shells, but included different base spacer components.

Specifically, the fluids tested were novel fluids 5, 7, and 13. All test fluids were compared to a control fluid of the same density and having the same base spacer components, but without nut shells: fluids 5C, 7C, and 13C.

Figure 8:
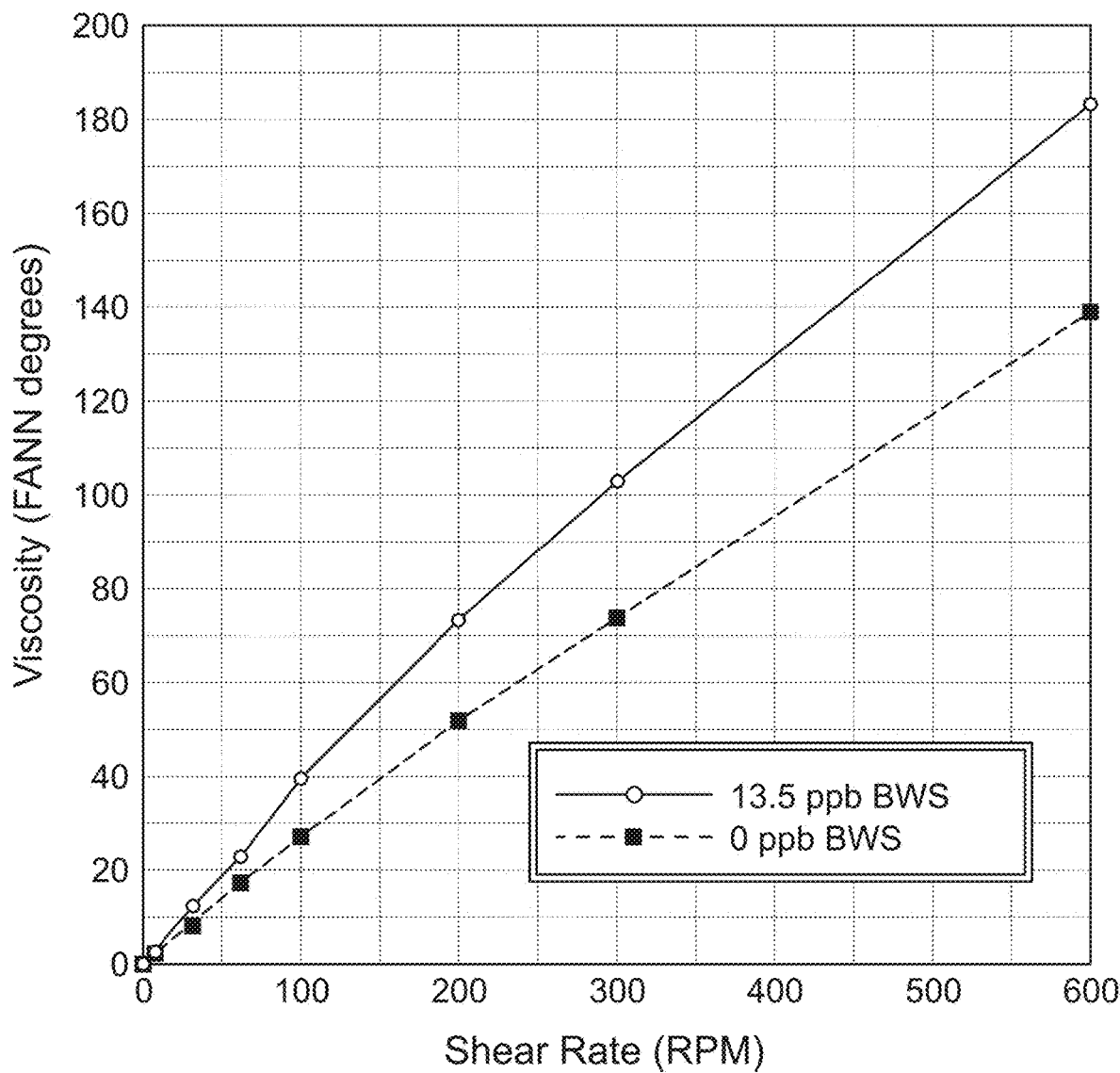
FIG. 8 is a graphical presentation of data collected in Example 12 showing the rheology of a test spacer fluid with nut shells at various shear rates as compared to a control fluid without nut shells.
Figure 9:
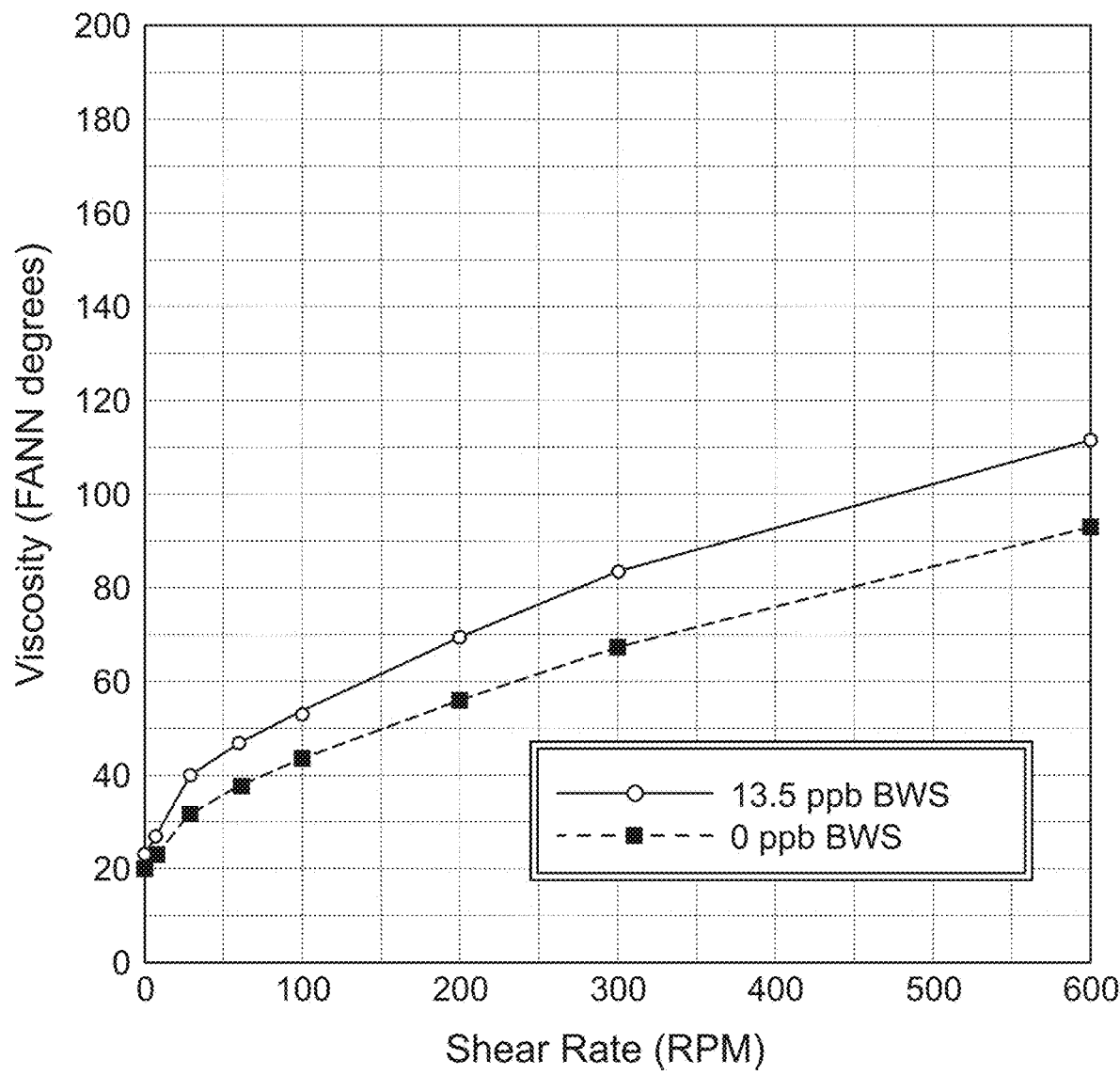
FIG. 9 is a graphical presentation of data collected in Example 12 showing the rheology of another test spacer fluid with nut shells at various shear rates as compared to a control fluid without nut shells.
Figure 10:
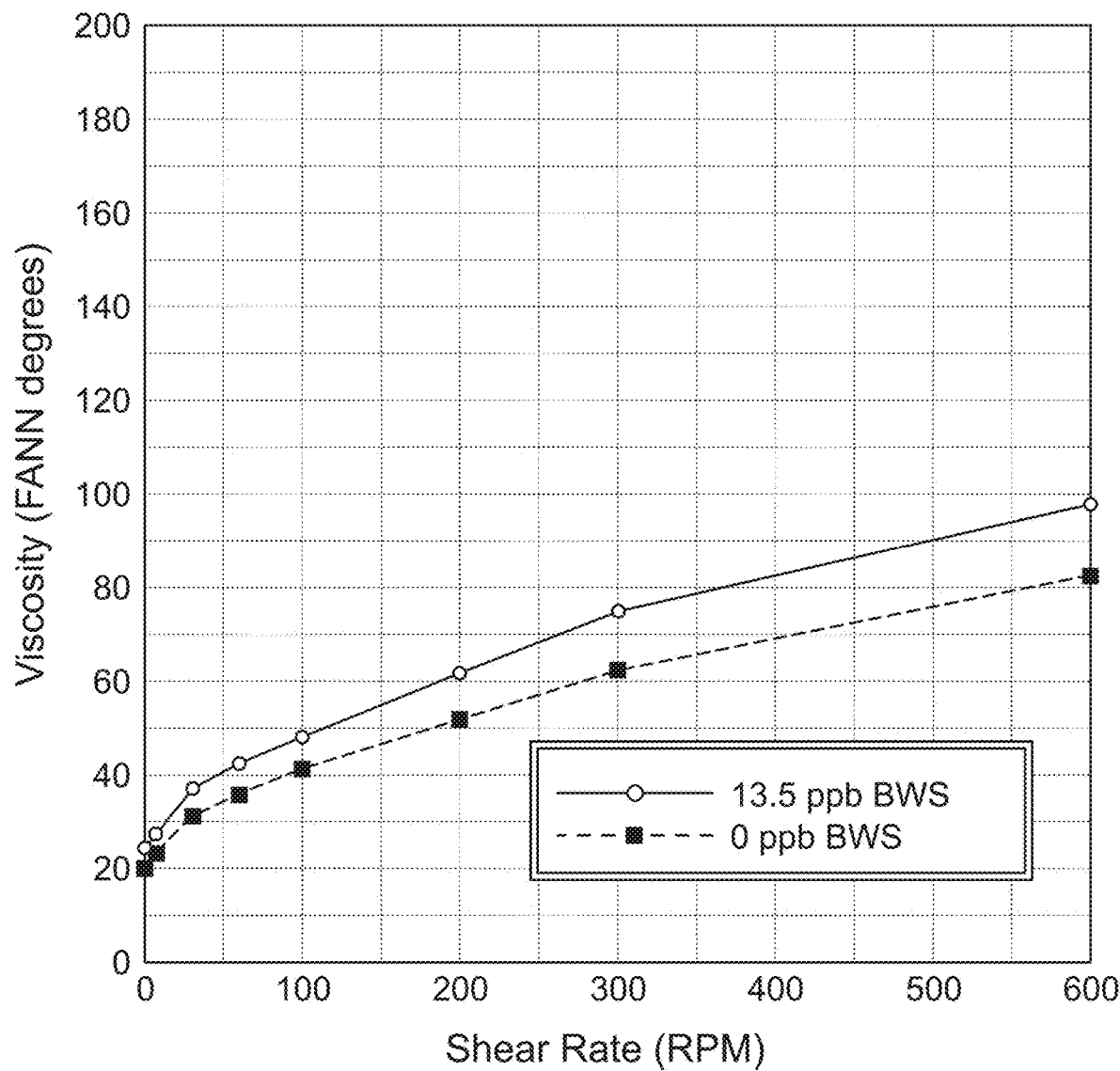
FIG. 10 is a graphical presentation of data collected in Example 12 showing the rheology of yet another test spacer fluid with nut shells at various shear rates as compared to a control fluid without nut shells.

The results of the viscosity testing are set forth below in Table 12 and presented in the graphs of FIGS. 8-10. Viscosity was recorded in Fann 35 dial readings ("FDR").

TABLE 12

Viscosity vs. Shear Rates

| | Fluid | | | | |
|---|---|---|---|---|---|
| | 5 | | 7 | | 13 |
| | Density (ppg) | | | | |
| | 12 | | 12 | | 12 |
| | Components (WA/SA/Surf) | | | | |
| | FAC/WG/S1 | | SF/DG/S2 | | SF/DG/S3 |
| | | | Nuts | | |
| | BWS | | BWS | | BWS |
| RPM | 5C | 5 | 7C | 7 | 13C | 13 |
| 600 | 139 | 183 | 93 | 112 | 83 | 98 |
| 300 | 75 | 104 | 67 | 83 | 62 | 75 |
| 200 | 53 | 75 | 56 | 69 | 52 | 62 |
| 100 | 29 | 41 | 44 | 54 | 42 | 49 |
| 60 | 19 | 25 | 38 | 47 | 37 | 43 |
| 30 | 10 | 14 | 32 | 39 | 32 | 38 |
| 6 | 4 | 5 | 23 | 27 | 24 | 28 |
| 3 | 3 | 4 | 21 | 25 | 22 | 26 |

It will be noted that all test fluids with black walnut shells showed increased viscosity at all shear rates as compared to their control fluids without nut shells. The increase in viscosity tended to increase at increasing shear rates. Thus, it should be possible to reduce the loading of other viscosifiers in a formulation, such as the suspending agent, and achieve equivalent performance.

Example 13

The viscosity of another flight of test fluids was measured at room temperature at various shear rates as described above. All test fluids had the same base spacer components, but included different loadings of black walnut shells.

Specifically, the fluids tested were novel fluids 11, 15, 12, and 16. All test fluids were compared to a control fluid of the same density and having the same base spacer components, but without nut shells: fluid 11C.

Figure 11:
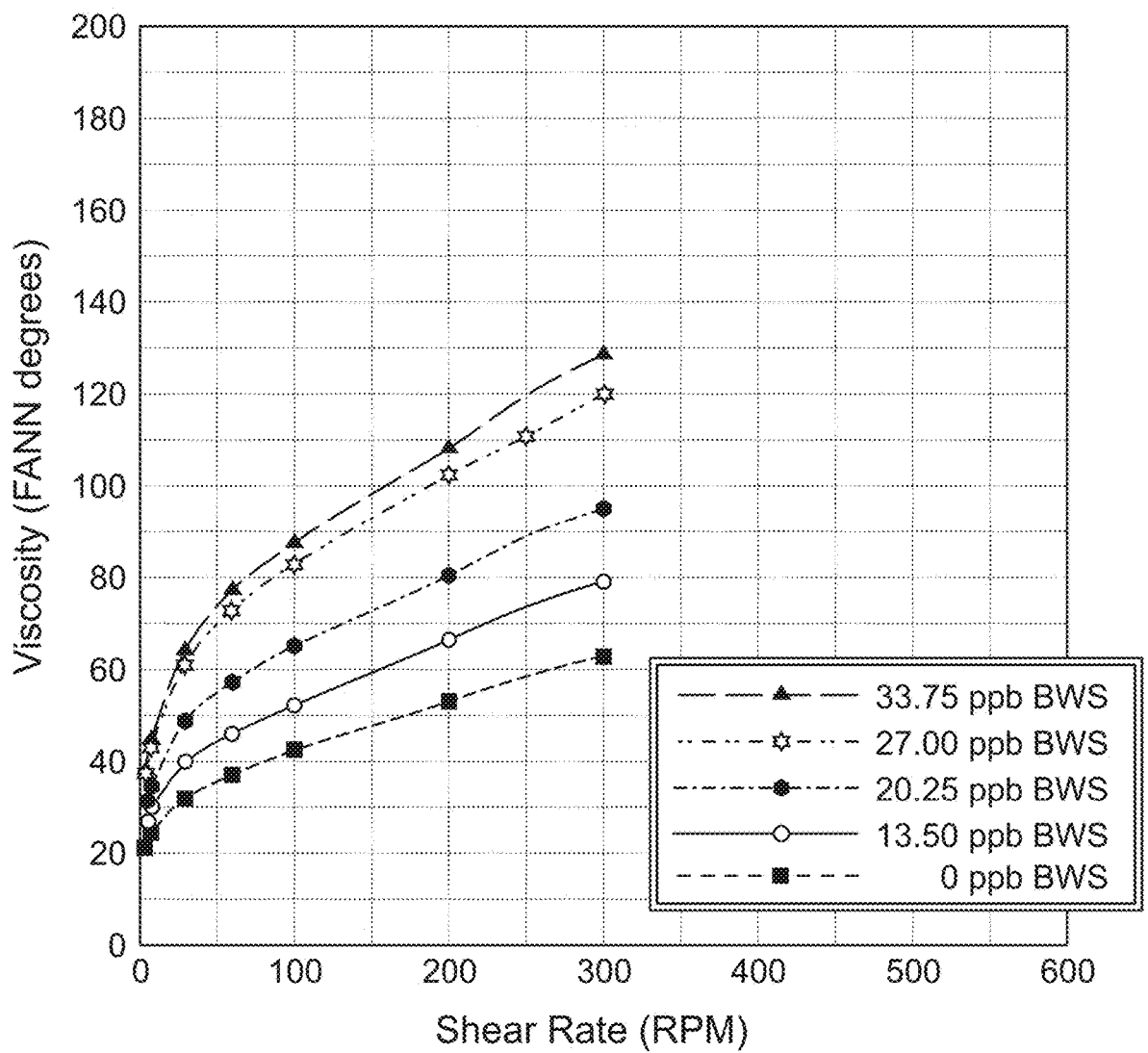
FIG. 11 is a graphical presentation of data collection in Example 13 showing the rheology of a test spacer fluid having various concentrations of nut shells at various shear rates as compared to a control fluid without nut shells.

The results of the viscosity testing are set forth below in Table 13 and presented in the graph of FIG. 11. Viscosity was recorded in Fann 35 dial readings ("FDR").

TABLE 13

| | Viscosity vs. Shear Rate | | | | |
|---|---|---|---|---|---|
| Fluid | 11C | 11 | 15 | 12 | 16 |
| Density (ppg) | 12 | 12 | 12 | 12 | 12 |
| Components (WA/SA/Surf) | SF/DG/S3 | SF/DG/S3 | SF/DG/S3 | SF/DG/S3 | SF/DG/S3 |
| BWS Loading (ppb) | | 13.5 | 20.25 | 27 | 33.75 |
| RPM | 11C | 11 | 15 | 12 | 16 |
| 600 | 87 | 104 | 121 | 139 | 157 |
| 300 | 63 | 79 | 95 | 120 | 128 |
| 200 | 53 | 66 | 81 | 102 | 109 |
| 100 | 43 | 52 | 65 | 83 | 88 |
| 60 | 37 | 46 | 58 | 73 | 77 |
| 30 | 32 | 40 | 49 | 62 | 64 |
| 6 | 25 | 30 | 35 | 43 | 44 |
| 3 | 22 | 26 | 31 | 38 | 38 |

It will be noted that all test fluids with black walnut shells showed increased viscosity at all shear rates as compared to the control fluid without nut shells. The increase in viscosity tended to increase at increasing shear rates. Thus, it should be possible to reduce the loading of other viscosifiers in a formulation, such as the suspending agent, and achieve equivalent performance.

It is believed that the testing as a whole shows that the addition of nut shells to a wide variety of otherwise conventional spacer fluids provides enhanced cleaning of synthetic and oil-based muds. Better cleaning of the annulus in turn will allow well cements to form a more intimate, continuous bond with the liner and formation and reduce the likelihood that fluids will migrate across zones through the cement sheath. Moreover, the addition of nut shells provides increased viscosity. The increased viscosity provides better suspension of particulates in the spacer and allows for reduced loadings of suspending agents and other viscosifying additives.

While this invention has been disclosed and discussed primarily in terms of specific embodiments thereof, it is not intended to be limited thereto. Other modifications and tin embodiments will be apparent to the worker in the art.

What is claimed is:

1. A method of cementing a liner in a well bore contaminated with an oil-based or synthetic fluid, said method comprising:
   (a) injecting an aqueous cleaning fluid into an annulus between said liner and said well bore, wherein said cleaning fluid comprises:
      i) a weighting agent;
      ii) a suspending agent;
      iii) a surfactant; and
      iv) nut shell particulates, said nut shell particulates being substantially free of adsorbed materials; and
      v) wherein said aqueous cleaning fluid provides at least about 5% improvement in cleaning performance as compared to an aqueous cleaning fluid identical to said aqueous cleaning fluid but lacking said nut shell particulates;
   (b) energizing said cleaning fluid to displace fluids present in said annulus and to create turbulent flow of said cleaning fluid in said annulus; said turbulent flow of said cleaning fluid being effective to remove oily residues of said oil-based or synthetic fluid from said annulus; and
   (c) injecting a cetnentitious slurry into said annulus after said cleaning fluid.

2. The method of claim 1, wherein said nut shell particulates are walnut shell particulates.

3. The method of claim 1, wherein said nut shell particulates are pecan shell particulates.

4. The method of claim 1, wherein said nut shell particulates are apricot pit particulates.

5. The method of claim 1, wherein said nut shell particulates are one or more nut shell particulates derived from the shells or pits of the group consisting of chestnuts, beechnuts, oak nuts, hazelnuts, walnut, pecans, other hickory nuts, coffee, jujube, mango, olive, açai palms, date palms, sabal palms, coconut palms, pistachio, white sapote, cashew, almond, apricot, cherry, damson, nectarine, peach, plum, Brazil nuts, and macadamia nuts.

6. The method of claim 1, wherein said cleaning fluid comprises up to about 200 ppb of said nut shell particulates.

7. The method of claim 1, wherein said cleaning fluid comprises up to about 100 ppb of said nut shell particulates.

8. The method of claim 1, wherein said cleaning fluid comprises up to about 50 ppb of said nut shell particulates.

9. The method of claim 1, wherein said cleaning fluid comprises from about 5 to about 35 ppb of said nut shell particulates.

10. The method of claim 1, wherein said cleaning fluid comprises at least about 2 ppb of said nut shell particulates.

11. The method of claim 1, wherein said nut shell particulates have a size of from about 6 to about 325 mesh.

12. The method of claim 1, wherein said nut shell particulates have a size of from about 20 to about 100 mesh.

13. The method of claim 1, wherein said nut shell particulates have a size of from about 30 to about 70 mesh.

14. The method of claim 1, wherein said improvement in cleaning performance is at least about 15%.

15. The method of claim 1, wherein said improvement in cleaning performance is at least about 20%.

16. A method of cementing a liner in a well bore, said method comprising:
   (a) injecting an aqueous cleaning fluid into an annulus between said liner and said well bore, wherein said cleaning fluid comprises:
      i) a weighting agent;
      ii) a suspending agent; and
      iii) nut shell particulates, said nutshells being substantially free of adsorbed materials; and
      iv) wherein said aqueous cleaning provides at least about 5% improvement in cleaning performance as compared to an aqueous cleaning fluid identical to said aqueous cleaning fluid but lacking said nut shell particulates;
   (b) energizing said cleaning fluid to displace fluids present in said annulus; and
   (c) injecting a cementitious slurry into said annulus after said cleaning fluid.

17. The method of claim 16, wherein said annulus has been contaminated with an oil or synthetic based fluid.

18. The method of claim 16, wherein said cleaning fluid is energized to create turbulent flow of said cleaning fluid in said annulus.

19. The method of claim 16, wherein said cleaning fluid comprises a surfactant.

20. A method of constructing a well; said method comprising:

(a) drilling a bore using an oil-based or synthetic drilling mud;
(b) installing a liner in said bore;
(c) injecting an aqueous cleaning fluid into said well to displace fluids in an annulus between said liner and said bore, said cleaning fluid comprising:
   i) a weighting agent;
   ii) a suspending agent; and
   iii) nut shell particulates, said nutshells being substantially free of adsorbed materials; and
   iv) wherein said aqueous cleaning provides at least about 5% improvement in cleaning performance as compared to an aqueous cleaning fluid identical to said aqueous cleaning fluid but lacking said nut shell particulates;
(d) injecting a cementitious slurry into said annulus; and
(e) allowing said cementitious slurry to set.

21. The method of claim 20, wherein said cleaning fluid is energized to create turbulent flow of said cleaning fluid in said annulus.

22. The method of claim 20, wherein said cleaning fluid comprises a surfactant.

23. The method of claim 20, wherein said nut shell particulates have a size of from about 6 to about 325 mesh.

24. A method of cementing a liner in a well bore contaminated with an oil-based or synthetic fluid, said method comprising:
(a) injecting an aqueous cleaning fluid into an annulus between said liner and said well bore, wherein said cleaning fluid consists essentially of:
   i) a weighting agent;
   i) a suspending agent;
   iii) a surfactant; and
   iv) nut shell particulates, said nut shell particulates being substantially free of adsorbed materials;
(b) energizing said cleaning fluid to displace fluids present in said annulus and to create turbulent flow of said cleaning fluid in said annulus, said turbulent flow of said cleaning fluid being effective to remove oily residues of said oil-based or synthetic fluid from said annulus; and
(c) injecting a cementitious slurry into said annulus after said cleaning fluid.

25. The method of claim 24, wherein said nut shell particulates are walnut shell particulates.

26. The method of claim 24, wherein said nut shell particulates are pecan shell particulates.

27. The method of claim 24, wherein said nut shell particulates are apricot pit particulates.

28. The method of claim 24, wherein said nut shell particulates are one or more nut shell particulates derived from the shells or pits of the group consisting of chestnuts, beechnuts, oak nuts, hazelnuts, walnut, pecans, other hickory nuts, coffee, jujube, mango, olive, açai palms, date palms, sabal palms, coconut palms, pistachio, white sapote, cashew, almond, apricot, cherry, damson, nectarine, peach, plum, Brazil nuts, and macadamia nuts.

29. The method of claim 24, wherein said cleaning fluid comprises up to about 200 ppb of said nut shell particulates.

30. The method of claim 24, wherein said cleaning fluid comprises up to about 100 ppb of said nut shell particulates.

31. The method of claim 24, wherein said cleaning fluid comprises up to about 50 ppb of said nut shell particulates.

32. The method of claim 24, wherein said cleaning fluid comprises from about 5 to about 35 ppb of said nut shell particulates.

33. The method of claim 24, wherein said nut shell particulates have a size of from about 6 to about 325 mesh.

34. The method of claim 24, wherein said nut shell particulates have a size of from about 20 to about 100 mesh.

35. The method of claim 24, wherein said nut shell particulates have a size of from about 30 to about 70 mesh.

* * * * *

UNITED STATES PATENT AND TRADEMARK OFFICE
CERTIFICATE OF CORRECTION

PATENT NO. : 10,858,569 B2
APPLICATION NO. : 16/219047
DATED : December 8, 2020
INVENTOR(S) : Roderick B. Pernites, Diankui Fu and Jordan Lee Clark Page 1 of 1

It is certified that error appears in the above-identified patent and that said Letters Patent is hereby corrected as shown below:

In Claim 1, in Column 28, at Line 4, delete "cetnentitious", and insert therein -- cementitious --.

In Claim 16, in Column 28, at Line 50, after "said aqueous cleaning", insert -- fluid --.

In Claim 20, in Column 29, at Line 9, delete "said nutshells", and insert therein -- said nut shell particulates --.

In Claim 20, in Column 29, at Line 11, after "said aqueous cleaning", insert -- fluid --.

Signed and Sealed this
Nineteenth Day of January, 2021

Andrei Iancu
*Director of the United States Patent and Trademark Office*